United States Patent [19]
Belding et al.

[11] Patent Number: 5,660,048
[45] Date of Patent: Aug. 26, 1997

[54] AIR CONDITIONING SYSTEM FOR COOLING WARM MOISTURE-LADEN AIR

[75] Inventors: William A. Belding, Danville; Chiang Lam, Milpitas, both of Calif.; William D. Holeman; Scott L. Janke, both of Baton Rouge, La.

[73] Assignees: LaRoche Industries, Inc., Baton Rouge, La.; ACMA Limited, Singapore

[21] Appl. No.: 601,110

[22] Filed: Feb. 16, 1996

[51] Int. Cl.$^6$ .................................................. F25D 17/08
[52] U.S. Cl. ............................... 62/94; 62/271; 165/7
[58] Field of Search ............................ 62/94, 93, 304, 62/271, 314; 165/7

[56] References Cited

U.S. PATENT DOCUMENTS

| | | | |
|---|---|---|---|
| 2,147,248 | 2/1939 | Fleisher | 62/176 |
| 2,233,189 | 2/1941 | Altenkirch | 62/139 |
| 2,266,219 | 12/1941 | Larriva | 62/139 |

(List continued on next page.)

FOREIGN PATENT DOCUMENTS

| | | | |
|---|---|---|---|
| 3902977 | 8/1989 | Germany | 96/125 |
| 51-029388 | 3/1976 | Japan | 96/153 |
| 54-011890 | 1/1979 | Japan | 96/154 |
| 54-019548 | 2/1979 | Japan | 96/125 |
| 55-119418 | 9/1980 | Japan | 26/153 |
| 56-016096 | 2/1981 | Japan | 96/150 |
| 56-030595 | 3/1981 | Japan | . |
| 57-056019 | 4/1982 | Japan | 96/153 |
| 63-240921 | 10/1988 | Japan | 96/125 |
| 63-264125 | 11/1988 | Japan | 96/125 |
| 2-52037 | 2/1990 | Japan | 96/153 |
| 5-200224 | 8/1993 | Japan | 96/153 |

OTHER PUBLICATIONS

GRI Report—Development of Desiccant Materials for Cooling System Applications Phase 1, W. A. Belding et al.
GRI Report—Advanced Desiccant Materials Assessment, R.K. Collier et al.

*Primary Examiner*—William Doerrler
*Attorney, Agent, or Firm*—Andrew Alexander

[57] ABSTRACT

A method of conditioning a process stream of air in an air conditioning system wherein a process stream of air is dehumidified and cooled to provide a conditioned stream of air for introducing to a conditioned space, the method comprises the steps of providing an enthalpy wheel comprised of an adsorbent contained in a paper web, the enthalpy wheel having a multiplicity of passages through which the process air can flow, the enthalpy wheel capable of regeneration by passing an air stream therethrough having a temperature and humidity lower than the process air. In the method, process air is passed through the enthalpy wheel to remove heat and moisture therefrom, and the enthalpy wheel is regenerated by passing air therethrough to remove heat and moisture therefrom. Thereafter, the method includes providing an adsorption wheel having a multiplicity of passages through which the process air from the enthalpy wheel can flow for adsorbing moisture, the wheel capable of adsorption of moisture from the process air and of regeneration. Process air from the enthalpy wheel is passed through the adsorption wheel to remove moisture, and the adsorption wheel is regenerated by passing hot gases therethrough to remove moisture. After passing through the adsorption wheel, process air is introduced to an indirect evaporative cooler having a dry channel and a wet channel separated by a moisture-impervious wall wherein heat is extracted from the dry channel through the wall to the wet channel, the process air from the adsorption wheel being introduced to the dry channel to provide cooled process air exiting the indirect evaporative cooler to provide a cooled stream of air having a controlled level of humidity. Air is directed to the wet channel of the indirect evaporative cooler, the air directed to the wet channel being selected from at least one of outside air, air returned from the conditioned space, a portion of the air from the enthalpy wheel, and a portion of the cooled air exiting the dry side of the indirect evaporative cooler.

33 Claims, 9 Drawing Sheets

U.S. PATENT DOCUMENTS

| | | | |
|---|---|---|---|
| 2,344,384 | 3/1944 | Altenkirch | 1183/4.7 |
| 2,790,505 | 4/1957 | Dow | 183/4.3 |
| 2,792,071 | 5/1957 | Pennington | 183/2 |
| 2,925,880 | 2/1960 | Munters | 183/4.6 |
| 3,009,540 | 11/1961 | Munters | 183/4.6 |
| 3,024,867 | 3/1962 | Milton | 95/124 |
| 3,176,444 | 4/1965 | Kiyonaga | 55/26 |
| 3,176,446 | 4/1965 | Siggelin | 55/189 |
| 3,230,689 | 1/1966 | Hussmann | 55/28 |
| 3,251,402 | 5/1966 | Glav | 165/7 |
| 3,266,973 | 8/1966 | Crowley | 162/164 |
| 3,274,751 | 9/1966 | Skarstrom | 55/33 |
| 3,293,192 | 12/1966 | Maher et al. | 252/430 |
| 3,323,288 | 6/1967 | Cheung et al. | 55/58 |
| 3,338,034 | 8/1967 | Hemstreet | 55/269 X |
| 3,382,141 | 5/1968 | Arledter et al. | 162/181.6 X |
| 3,402,996 | 9/1968 | Maher et al. | 23/112 |
| 3,405,507 | 10/1968 | Spencer et al. | 55/62 |
| 3,464,186 | 9/1969 | Hankison et al. | 55/163 |
| 3,488,971 | 1/1970 | Meckler | 62/3 |
| 3,531,916 | 10/1970 | Kulperger et al. | 55/33 |
| 3,555,787 | 1/1971 | Lustig | 55/179 |
| 3,664,095 | 5/1972 | Asker et al. | 55/387 |
| 3,694,202 | 9/1972 | Sawyer, Jr. et al. | 162/181.6 X |
| 3,713,281 | 1/1973 | Asker et al. | 55/387 |
| 3,800,515 | 4/1974 | Asker et al. | 162/181.6 X |
| 3,807,149 | 4/1974 | Norback | 96/125 X |
| 3,844,737 | 10/1974 | Macriss et al. | 96/125 X |
| 3,889,742 | 6/1975 | Rush et al. | 165/7 |
| 4,012,206 | 3/1977 | Macriss et al. | 95/113 |
| 4,064,304 | 12/1977 | Fujita et al. | 162/181.6 X |
| 4,093,435 | 6/1978 | Marron et al. | 55/269 X |
| 4,113,004 | 9/1978 | Rush et al. | 165/3 |
| 4,121,432 | 10/1978 | Weil et al. | 62/79 |
| 4,134,743 | 1/1979 | Macriss et al. | 95/113 |
| 4,172,164 | 10/1979 | Meyer et al. | 428/72 |
| 4,255,171 | 3/1981 | Dravnieks | 55/269 X |
| 4,259,092 | 3/1981 | Matsuo et al. | 96/125 X |
| 4,289,513 | 9/1981 | Brownhill et al. | 55/387 |
| 4,370,249 | 1/1983 | Bird et al. | 252/607 X |
| 4,398,927 | 8/1983 | Asher et al. | 55/34 |
| 4,504,290 | 3/1985 | Pontius | 96/153 |
| 4,594,855 | 6/1986 | Gunther | 62/92 |
| 4,668,249 | 5/1987 | Purdue | 55/33 |
| 4,701,431 | 10/1987 | Pine | 502/73 |
| 4,719,761 | 1/1988 | Cromer | 62/94 |
| 4,723,417 | 2/1988 | Meckler | 62/271 |
| 4,729,774 | 3/1988 | Cohen et al. | 55/181 |
| 4,729,853 | 3/1988 | von Bonin | 252/607 X |
| 4,749,388 | 6/1988 | Francois | 55/221 |
| 4,769,053 | 9/1988 | Fischer, Jr. | 96/125 |
| 4,871,607 | 10/1989 | Kuma et al. | 428/186 |
| 4,875,520 | 10/1989 | Steele et al. | 165/10 |
| 4,886,769 | 12/1989 | Kuma et al. | 502/62 |
| 4,911,775 | 3/1990 | Kuma et al. | 156/208 |
| 4,946,479 | 8/1990 | Izumo | 96/123 |
| 4,959,970 | 10/1990 | Meckler | 62/176.1 |
| 4,977,753 | 12/1990 | Maisotsenko et al. | 62/121 |
| 5,017,268 | 5/1991 | Clitherow et al. | 162/181.6 X |
| 5,050,391 | 9/1991 | Tsimerman | 62/94 |
| 5,052,188 | 10/1991 | Komarneni et al. | 62/94 |
| 5,126,076 | 6/1992 | Graf et al. | 252/607 X |
| 5,130,184 | 7/1992 | Ellis | 252/607 X |
| 5,167,679 | 12/1992 | Maekawa et al. | 96/125 |
| 5,170,633 | 12/1992 | Kaplan | 62/94 |
| 5,187,946 | 2/1993 | Rotenberg et al. | 62/314 |
| 5,194,414 | 3/1993 | Kuma | 96/153 X |
| 5,225,236 | 7/1993 | Keusch et al. | 428/920 X |
| 5,230,955 | 7/1993 | Diroll et al. | 428/920 X |
| 5,238,052 | 8/1993 | Chagnot | 165/8 |
| 5,242,473 | 9/1993 | Ogasahara | 96/125 |
| 5,250,350 | 10/1993 | Tung | 428/920 X |
| 5,256,476 | 10/1993 | Tanaka et al. | 428/241 |
| 5,300,138 | 4/1994 | Fischer et al. | 96/125 |
| 5,304,419 | 4/1994 | Shores | 428/355 |
| 5,308,703 | 5/1994 | Tsujimoto et al. | 96/153 X |
| 5,374,335 | 12/1994 | Lindgren et al. | 162/181.6 X |
| 5,401,706 | 3/1995 | Fischer | 96/125 X |

AIR CONDITIONING SYSTEM FOR COOLING WARM MOISTURE-LADEN AIR

BACKGROUND OF THE INVENTION

This invention relates to an improved method and apparatus for conditioning air such as warm moisture-laden air and more particularly, it relates to a novel combination for moisture removal and for evaporative cooling.

Current air conditioning technology is based on compression and expansion of a gas such as chlorinated fluorocarbon or halogenated chloroflurocarbon or ammonia. The gas is compressed to a liquid state and then allowed to expand back to a vapor state. In the expansion stage of the process, heat is required to change the liquid back to a gas. However, this system has the disadvantage that the chlorinated fluorocarbons and the halogenated chlorofluorocarbons have been found to be environmentally damaging particularly to the earth's ozone layer. Ammonia results in health and safety problems when leaks develop in the system.

Vapor compression systems have another disadvantage in that they require electricity to chive compressors. At peak demand periods, the electricity required by air conditioning systems has resulted in brownouts. Thus, there is a great need for an air conditioning system that would greatly reduce the electricity demand.

Evaporative cooling technology provides an alternative to vapor compression technology. In direct evaporative cooling, water is evaporated into the air stream entering the space to be cooled. The evaporation of the water reduces the air temperature. In an indirect evaporative cooling system, the primary air stream is cooled in a dry duct. An air stream is directed into an adjacent wet duct having a common wall with the dry duct. In the wet duct, water is evaporated into the air cooling the common wall and consequently the air in the dry duct. However, the evaporative cooling systems have the problem that they cannot be used in hot humid climates.

Desiccant cooling technology has been used for air conditioning wherein a desiccant material is used to remove water from air to provide a dry air stream. The dry air is then cooled as closely as practical to ambient and then water is evaporated by and into the air stream to provide cooler air. This technique works well in theory; however, in practice, it has not been used very much. Desiccant cooling has the problem that it usually requires one or more heat wheels to provide an efficient-system and to operate with hydrocarbon as the fuel source. Heat wheels are subject to leakage. In addition, heat wheels add complexity, size, weight and cost to the cooling system. Another problem with desiccant systems is the addition of heat to the air that is to be cooled.

Several attempts have been made to solve the above problems but usually with only limited success. For example, Tsimerman U.S. Pat. No. 5,050,391 discloses an apparatus and method for treating a gas in which a main gas stream is cooled and heat is transferred by convection to a liquid and a secondary gas stream across a heat transfer surface. Liquid bearing the heat evaporates into the secondary stream. A total gas stream is subjected to initial cooling along a moisture impervious space of a heat exchange element to cause dry or sensible cooling. A secondary gas stream is diverted from the total discharge from the dry cooling stage and is directed counterflow to the total stream at the opposite surface of the heat exchange element which is an absorbent surface to cause heating and humidification of the secondary stream. The remaining cooled stream which is the primary stream is subjected to sorbent treatment to heat and dehumidify the same by flowing it through an absorbent media. The primary gas flow is then subjected to a final heat exchange treatment stage similar to the initial heat exchange treatment. Condensate may be removed from the saturated or near-saturated secondary flow. The primary flow may also be subjected to intermediate cooling treatment. A portion of the initial and final dry cooling stages preferably include an adiabatic cooling zone. The secondary flow from the initial heat exchanger may be subdivided into two streams. One secondary sub-stream is dehumidified in the sorption device by an auxiliary heater and is used for regeneration of the absorbent media. However, this system discloses the use of a complicated adsorbent belt or plate and tubular heat transfer elements and therefore does not lend itself to easy commercialization.

Gunther U.S. Pat. No. 4,594,855 discloses a process and apparatus for ventilation with heat exchange wherein outdoors and indoors air streams are induced to travel in opposite directions through the adjacent passages of a plate-fin heat exchanger. A water stream is simultaneously induced to circulate through the passages occupied by the cooler of the air streams. Heat is transferred across adjacent passages, causing vaporization of a portion of the water stream into its accompanying air stream, thus keeping the cooler stream saturated with water vapor. The hotter air stream is cooled and dehumidified while the cooler one increases in temperature and humidity content.

Maisotsenko et al U.S. Pat. No. 4,977,753 discloses a method for indirect evaporative air cooling wherein the main air stream in a room is cooled by passing it along the dry duct and simultaneously passing an auxiliary air stream that has been taken from the atmosphere in a countercurrent flow along the moist duct, which is in heat-exchange interaction with the dry duct. To provide more intensified cooling, the auxiliary stream is precooled in another dry duct, which is in heat-exchange interaction with another moist duct.

Rotenberg et al U.S. Pat. No. 5,187,946 discloses an apparatus and method for indirect evaporative cooling of a fluid which includes an apparatus and method for indirect cooling of air from its ambient temperature to substantially its dew point. Ambient air is redirected through spaced openings formed along the heat exchanger plates to form a secondary air stream.

In the following patents, desiccants or adsorbents are used in conditioning air and, in particular, for lowering the humidity of the air: U.S. Pat. Nos. 2,147,248; 2,233,189; 2,266,219; 2,344,384; 3,25 1,402; 3,889,742; 4,113,004; 4,121,432; 4,719,761; 4,723,417; and 4,729,774.

Kaplan U.S. Pat. No. 5,170,633 describes a method and apparatus for conditioning air utilizing a desiccant based air conditioning system requiring substantially less regeneration energy than typical systems. This regeneration energy reduction is accomplished through the use of two separate desiccant devices and an indirect evaporative cooler having both a wet and dry side for air flow-through. In the first desiccant device regeneration air is first passed through the wet side of the indirect evaporative cooler wherein it is humidified and heated. This air is then dehumidified by passing it through the second desiccant device which is operated at a high moisture content. This results in a substantial amount of moisture being adsorbed from the first regeneration air stream causing a substantial air temperature increase and thereby, reducing the auxiliary heat required. The second desiccant device may be regenerated with ambient air.

Meckler U.S. Pat. No. 3,488,971 discloses air for comfort conditioning which is circulated through a chemical dehumidifier and then is forwarded to a space to be conditioned. Optional sensible cooling coils before and after chemical dehumidification are provided. Most of the lighting heat and most of the space load are transferred to relatively high temperature water, and from the water to the chemical dehumidifier for regeneration of the desiccant therein. A thermally activated heat pump, which can be of the thermoelectric type, is used to transfer heat to the high temperature water.

In spite of these disclosures, there is still a great need for a compact, economical air conditioning unit that functions in warm, moisture-laden air, e.g., outdoor air, or in warm dry air and which does not require large amounts of electricity in order to function. The present invention provides such an air conditioning system utilizing a novel combination of desiccant systems and evaporative cooling systems.

SUMMARY OF THE INVENTION

It is an object of this invention to provide an improved air conditioning system.

It is another object of this invention to provide an improved method for conditioning hot, moisture-laden air.

It is still another object of this invention to provide an improved air conditioning system comprised of a novel combination of desiccant and indirect evaporative cooling.

Still, it is another object of this invention to provide in an air conditioning system utilizing indirect evaporative cooling and/or direct evaporative cooling, a novel desiccant body, such as a desiccant wheel, comprising X- or Y-type zeolite, silica, alumina or blends thereof having a modified isothermal behavior.

Yet, it is another object of this invention to provide, in an air conditioning system utilizing indirect evaporative cooling, a novel desiccant wheel comprised of an X-type or Y-type zeolite having a modified isothermal behavior to yield a water adsorption isotherm having a Type-1M isotherm with a separation factor in the range of 0.03 to 0.2.

And yet, it is another object of this invention to provide an improved air conditioning system comprising a novel desiccant wheel, indirect evaporative cooling system employing one or two dry cooling steps to produce a primary, cooled dry stream of air wherein at least in one of the steps a portion of the cooled, dry air is returned to flow countercurrent to the primary, cooled dry air stream in a wet duct to further cool said primary dry stream of air.

Still yet, it is another object of this invention to provide a system including an enthalpy wheel suitable for pretreating process air comprised of a large fraction of hot humid outdoor air.

These and other objects will become apparent from the specification, claims and drawings appended hereto.

In accordance with these objects, there is provided a method of conditioning a process stream of air in an air conditioning system wherein a process stream of air is dehumidified and cooled to provide a conditioned stream of air for introducing to a conditioned space, the method comprises the steps of providing an enthalpy wheel comprised of an adsorbent contained in a paper web, the enthalpy wheel having a multiplicity of passages through which the process air can flow, the enthalpy wheel capable of regeneration by passing an air stream therethrough having a temperature and humidity lower than the process air. In the method, process air is passed through the enthalpy wheel to remove heat and moisture therefrom, and the enthalpy wheel is regenerated by passing air therethrough to remove heat and moisture therefrom. Thereafter, the method includes providing an adsorption wheel having a multiplicity of passages through which the process air from the enthalpy wheel can flow for adsorbing moisture, the wheel capable of adsorption of moisture from the process air and of regeneration. Process air from the enthalpy wheel is passed through the adsorption wheel to remove moisture, and the adsorption wheel is regenerated by passing hot gases therethrough to remove moisture. After passing through the adsorption wheel, process air is introduced to an indirect evaporative cooler having a dry channel and a wet channel separated by a moisture-impervious wall wherein heat is extracted from the dry channel through the wall to the wet channel, the process air from the adsorption wheel being introduced to the dry channel to provide cooled process air exiting the indirect evaporative cooler to provide a cooled stream of air having a controlled level of humidity. Air is directed to the wet channel of the indirect evaporative cooler, the air directed to the wet channel being selected from at least one of outside air, air returned from the conditioned space, a portion of the air from the enthalpy wheel, and a portion of the cooled air exiting the dry side of the indirect evaporative cooler.

DETAILED DESCRIPTION OF THE PREFERRED EMBODIMENTS

Figure 1:
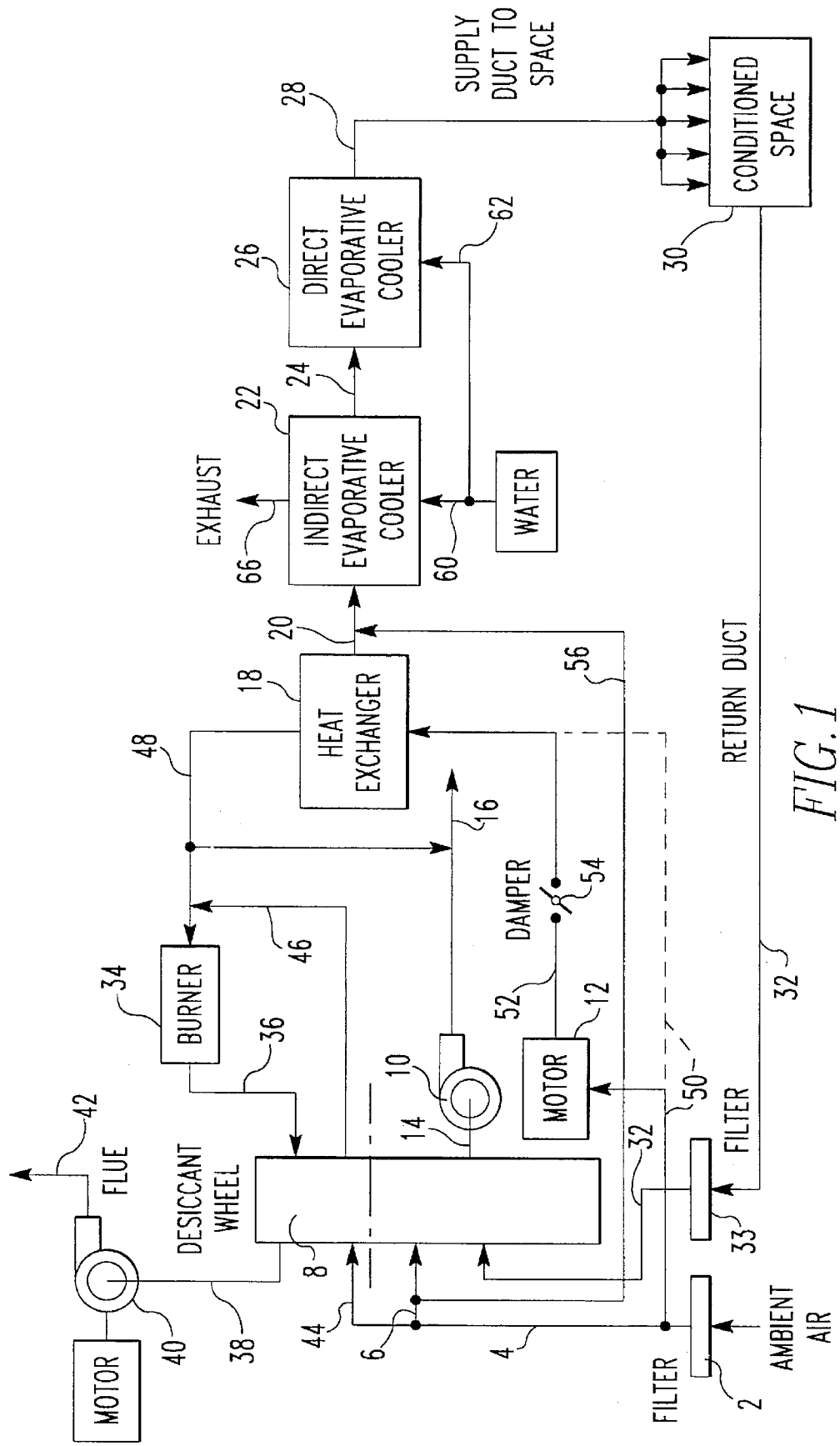
FIG. 1 is a flow diagram showing air flow steps as air is conditioned in accordance with the present invention.

Referring now to FIG. 1, there is shown a flow diagram illustrating the steps in dehumidifying and cooling a stream of air in the air conditioning system in accordance with the present invention. In FIG. 1, an ambient or outdoor air stream is first passed through air filter 2 to remove material such as dust particles and bugs, for example, before being passed along lines 4 and 6 to desiccant wheel 8. An air mover means such as fan 10 may be employed to draw or force the air stream through the air conditioning system. Fan 10 may be powered by an electric motor 12. As air, such as moisture-laden air, is passed through desiccant wheel 8, moisture is removed from the air stream to provide a moisture-depleted stream which passes along line 14, through fan 10 and along line 16. All or a portion of the moisture-depleted stream of process air is passed through heat exchanger 18. As air passes through desiccant wheel 8, the air becomes heated by virtue of heat of absorption of the moisture on the desiccant. Further, because desiccant wheel 8 is heated for regenerative or desiccant drying purposes, air passing therethrough becomes heated. Thus, the air leaving desiccant wheel 8 along line 14 is at a much higher temperature, e.g., 175° F. in certain sections, than the outdoor ambient air.

Moisture can be removed from the air in desiccant wheel 8 from levels of 0.01364 pounds of water per pound of air to levels of 0.0054 pounds or lower of water per pound of air, for example. This low level of water can be maintained through the air conditioning system and water added, if needed, as a last step.

In the present invention, fan 10 is located between desiccant wheel 8 and heat exchanger 18. In this schematic, fan 10 draws air through desiccant wheel 8 and pushes air through heat exchanger 18 and thus circulates process air through the air conditioning system. This position of the fan 10 is selected in order to decrease the pressure drop across seals on desiccant wheel 10. In a preferred position, fan 10 is located between heat exchanger 18 and indirect evaporative cooler 22. It will be appreciated that other locations for fan 10 can be used.

When fan 10 is located between heat exchanger 18 and indirect evaporative cooler 22, it can draw process air through desiccant wheel 8 and heat exchanger 18. Further, it is desired to pass only a portion of the process air through desiccant wheel 8, then a bypass loop 56 can be provided which takes process air past desiccant wheel 8 and heat exchanger 18 as shown in FIG. 1.

Because process air stream 14 leaving desiccant wheel 8 has a temperature higher than outdoor ambient air, for efficient processing or cooling, it is preferred to cool the air or remove heat therefrom by passing air stream 16 of process air through heat exchanger 18 as noted. Exterior or outdoor air e.g., process air, entering desiccant wheel 8 can have a temperature in the range of about 75° to 110° F., and the temperature exiting desiccant wheel 8 typically is in the range of 100° to 200° F. Further, typically, air stream 20 of process air leaving heat exchanger 18 usually has a temperature in the range of 100° to 140° F.

In the present invention, process air from heat exchanger 18 is introduced to indirect evaporative cooler 22 where it is cooled further to provide cooled dry air typically having a temperature in the range of 55° to 75° F. Different indirect evaporative coolers may be used, as will be explained later.

After the air stream is cooled in indirect evaporative cooler 22, it may be passed along line 24 to direct evaporative cooler 26 or in certain cases, it may be directed to a room or building to provide conditioned air. In direct evaporative cooler 26, the temperature of the air can be reduced further and a controlled amount of humidity can be added thereto to provide conditioned air having a controlled temperature and humidity. The conditioned air leaving direct evaporative cooler can have a temperature in the range of 50° to 65° F. The conditioned air is conveyed along line 28 to conditioned space 30.

In the present invention, a controlled amount of air may be recirculated from the conditioned space along line 32 through filter 33 to desiccant wheel 8 where outdoor air is added along line 6 where both are added to provide process air 14.

In the air conditioning system of the present invention, the desiccant in the desiccant wheel is regenerated by heated air from burner or heater 34 which is passed along line 36 to desiccant wheel 8 where it is passed therethrough to remove water from desiccant wheel 8 by vaporization. Typically, the heated air in line 36 has a temperature in the range of 150° to 375° F. Further, preferably, heated air from burner 34 is drawn through line 38 from desiccant wheel 8 by fan 40 where it may be expelled to the atmosphere through line 42.

In another feature of the present air conditioning system, it has been found important to purge the desiccant wheel prior to passing process air therethrough which is to be supplied to a conditioned space. That is, in the present invention, desiccant wheel 8 can be regenerated using a gas burner or any other heat source to heat air. The gas burner exhaust and heated air can be directly passed through desiccant wheel 8 at relatively high temperatures, as noted, for purposes of regeneration. However it is important to remove any residual exhaust gases from desiccant wheel 8 prior to introducing process air thereto in order to avoid contamination of the conditioned air. Thus, in the present invention, a fresh air purge is introduced along line 44 immediately after the regenerative step and before introduction of process air; e.g., outdoor air or recycled air, from the conditioned space. Even though the primary purpose of the purge is to remove residual gases from the desiccant wheel, the purge also has the effect of cooling desiccant wheel 8 prior to introduction of process air thereto. To recapture heat removed from desiccant wheel 8 by the purge, the air purge stream exiting desiccant wheel 8 can be removed along line 46 and introduced as air for blurting or heating in burner 34.

In the present invention, air is used to cool heat exchanger 18 and thus hot air from heat exchanger 18 is removed along line 48 and introduced for heating and burning in burner 34. Air used to cool heat exchanger 18 can be outdoor air which may be introduced along line 50, optionally over electric motor 12 and along line 52 to heat exchanger 18. Line 52 can be provided with a damper 54 to control or even stop the flow of air through heat exchanger 18.

It should be noted that two separate air streams are utilized in the air conditioning system of the invention. That is, one stream of air used for regeneration purposes is dram through line 50, 52, heat exchanger 18, line 48 and burner 34 by fan 40 and purge air may be drawn through line 44, desiccant wheel 8, line 46, burner 34, line 36, back through desiccant wheel 8 after heating by fan 40. A second stream of air which is process air is drawn or pushed through the air conditioning system using fan 10. It will be appreciated that utilizing two fans prevents commingling of air passing through desiccant wheel 8. Further, fan 40 can be operated at lower pressure than fan 10, and thus this prevents heated air and combustion products from leaking across the desiccant wheel seals and mingling with process air introduced along line 6 or 32.

For purposes of efficiency, if humidity in outdoor air introduced along line 6 is low, a sensor can be provided to direct process air or a portion thereof around desiccant wheel 8 and heat exchanger 18 along line 56 to permit flow of air therethrough to line 20. Simultaneously therewith, burner 34, fan 40 and desiccant wheel 8 can be shut down or operated at reduced loading or capacity, further improving economic operation of the cooling unit.

With respect to indirect evaporative cooler 22 and direct evaporative cooler 26, a water source 64 is provided and water is introduced along lines 60 and 62.

Air introduced along line 20 to the dry side of an indirect evaporative cooler 22 may be referred to as primary or process air which is cooled without change in humidity. A secondary source of air may be introduced to the wet side of the indirect evaporative cooler to cool the primary or process air through a heat exchange wall, for example, and is exhausted from indirect evaporative cooler 22 along line 66. The secondary source of air or extraneous air may be outdoor which is introduced to the wet side. Or, the secondary source of air introduced to the wet side can be air returned from the conditioned space. Both sources of air, which may be referred to as extraneous air, are preferably introduced to the wet side to flow countercurrent to the flow of process air in the dry side of the indirect evaporative cooler.

Figure 10:
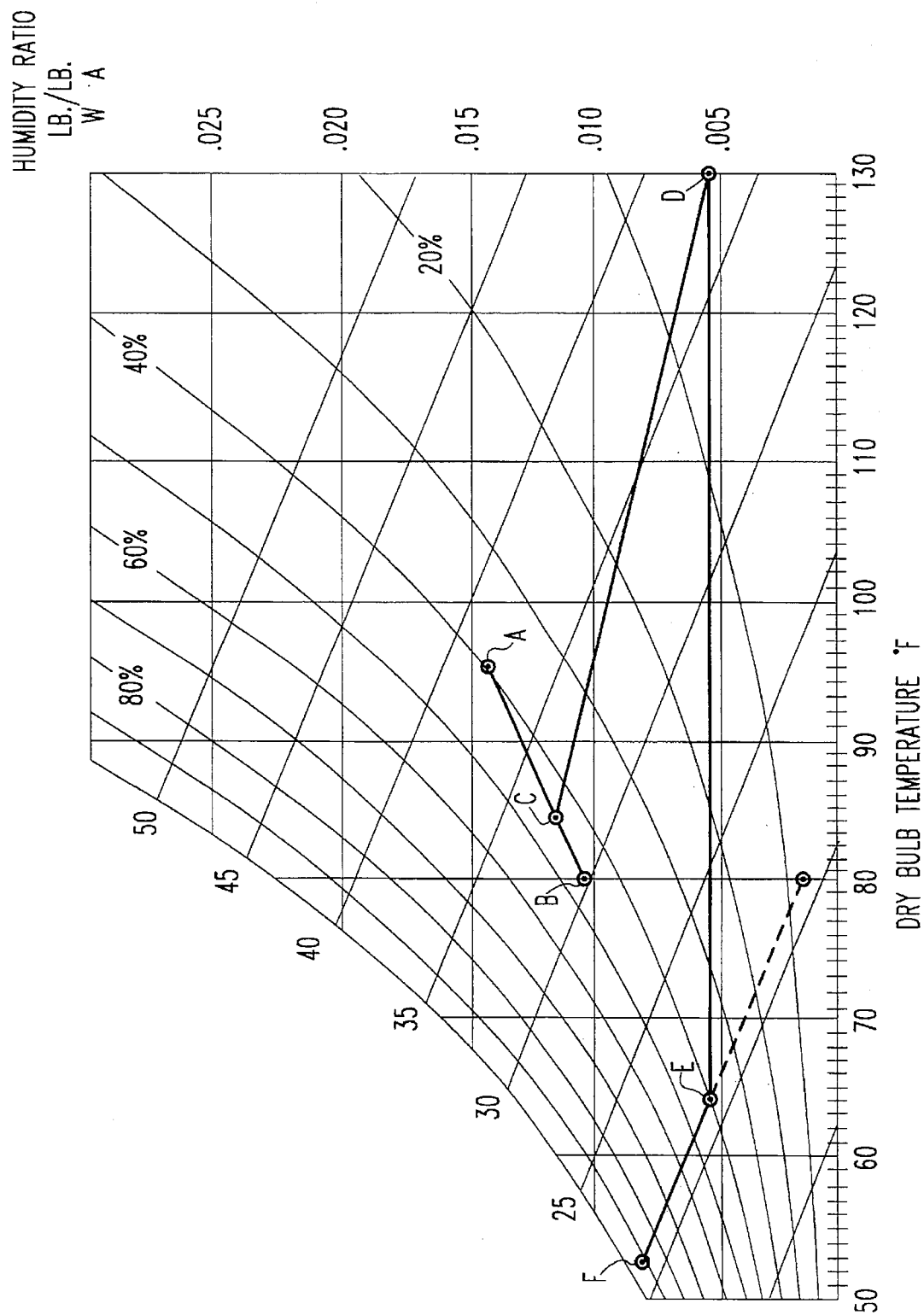
FIG. 10 is a psychrometric chart comparing conventional air cooling to air conditioning of the invention.

The basic thermodynamics of the invention are shown in FIG. 10. Conventional desiccant cooling technology is generally designed to dry the air to a very dry condition, e.g., 0.002 g/kg., and then cool it as closely as possible to ambient air temperature before humidifying it. Thus, the air is dried and cooled to point "X" on the psychometric chart (FIG. 10). It is then saturated with water vapor and its temperature drops as the air becomes moister along an iso-enthalpic line on the chart. This takes the air to point F on the chart where it is then introduced to the space to be cooled.

The subject invention operates with an indirect evaporative cooling device that can effectively utilize moister and hotter inlet air than a system with a heat wheel and a direct evaporative cooler. An indirect evaporative cooler consists of alternating wet and dry channels seperated by thin walls. Heat is removed from the dry channels across the separating walls to the cooler wet channels. Thus, in FIG. 10, a mixture "C" of outdoor air "A" and indoor air "B" is dehumidified to point "D" before entering the indirect evaporative cooler. The air used for space cooling is sensibly cooled from point "D" along a constant absolute humidity line to point "E" which typically is a 60 to 85% approach to its dew point. At point "E", the air leaves the indirect evaporative cooler and may be introduced to a direct evaporative cooler where it is saturated to point "F", if desired, or to any point between "E" and "F", depending on the desired final humidity. A second stream of air which is not shown on the chart is passed through the wet channels of the indirect evaporative cooler becoming saturated with moisture, providing a cold sink for the device. Preferably, this air is passed countercurrent to the air in the dry channels gaining heat across the walls and exiting at a temperature approaching the inlet temperature of the dry channels. As the temperature of the air in the wet channels increases, its capacity for moisture also increases allowing further evaporation to take place. The hot, moist air exiting the wet channels is exhausted to the exterior. The optimum amount of exhaust is a function of the change in enthalpy for each air stream in the evaporative cooler. The enthalpy change in the first air stream must balance that in the second air stream. Since the enthalpy of saturated air increases non-linearly with higher temperature, the ratio of exhaust air can nominally be maintained less than 50% of the inlet air stream. The outlet condition achieved by the indirect evaporative cooler depends on the starting condition of the secondary air stream. For example, if building return air is used, the initial state of the air entering the wet channels is hotter and more humid than if supply air is used. Therefore, more air must be passed through the wet channels to achieve the same outlet condition than if cooler and drier supply air were used. Since the volume of exterior make-up air to the system must equal or exceed the volume of exhaust, it is advantageous to minimize the exhaust volume from the indirect evaporative cooler. Therefore, it is preferred to use a portion of the air exiting the dry channels at condition "E" for the evaporative process in the wet channels. If this air is used, 30% or less of the inlet volume is needed for evaporation in the wet channels.

Figure 11:
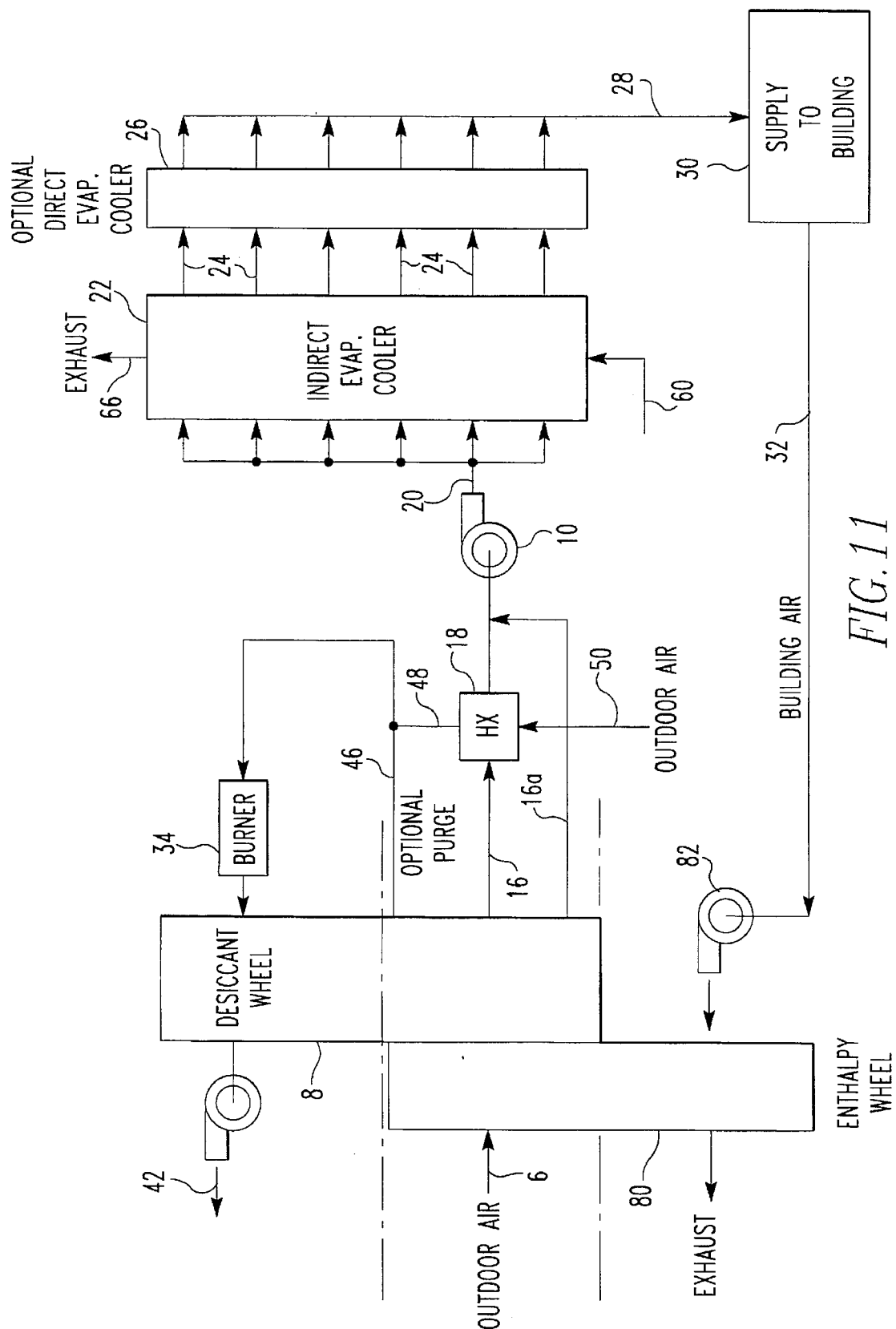
FIG. 11 shows an air conditioning system utilizing an enthalpy wheel and a desiccant wheel in accordance with the invention.

Another embodiment of the invention is illustrated in FIG. 11. In this embodiment, an enthalpy wheel 80 is located before desiccant wheel 8. That is, in this embodiment, outdoor air or ambient air is first introduced to enthalpy wheel 80 before entering desiccant wheel 8. In enthalpy wheel 80, sensible heat and moisture are adsorbed from outdoor air 6 prior to the air entering desiccant wheel 8. Thus, both heat and moisture are removed from outdoor air 6 before it is further dried in desiccant wheel 8. Enthalpy wheel 80 is regenerated using a source of air which is drier and cooler, such as air from conditioned space 30. Air from conditioned space 30 is passed along line 32 using fan 82 and introduced to enthalpy wheel 80 in a direction countercurrent to the flow of outdoor air 6. Fan 82 may be located on the exhaust side of enthalpy wheel 80 in a draw through mode. This embodiment of the invention can incorporate all the features set forth in FIG. 1 and is illustrated in FIG. 11. This embodiment of the invention has the advantage that it is particularly suitable for processing outdoor air for purposes of providing conditioned air. However, mixtures of outdoor air and recycled air can be employed.

Figure 12:
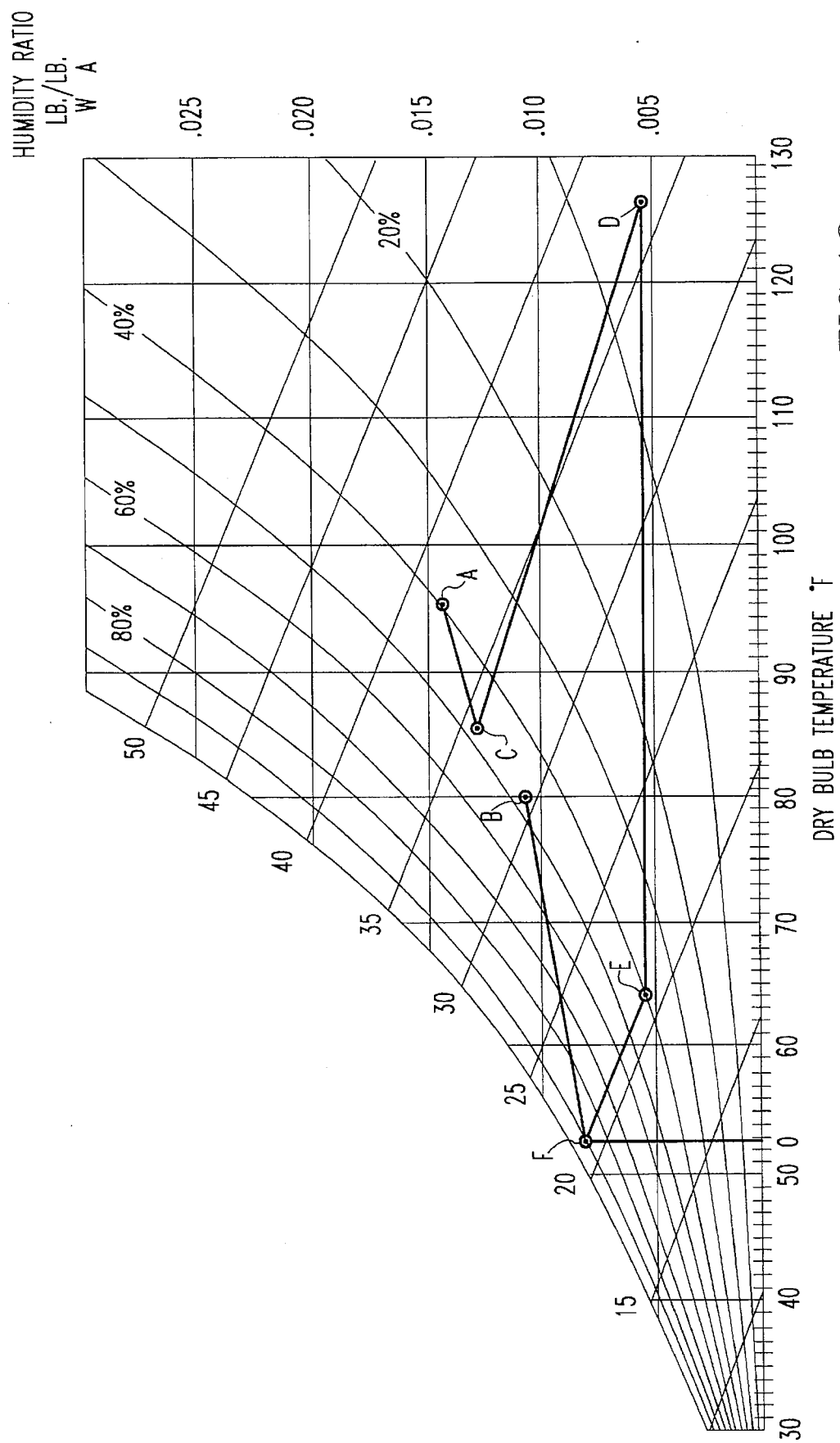
FIG. 12 is a psychrometric chart showing the cooling of process air using the enthalpy wheel and desiccant wheel in accordance with the invention

The operation of removing heat and moisture utilizing the enthalpy wheel is represented by the line A-C is represented on the psychometric chart. (FIG. 12). Outdoor air at condition "A" (FIG. 12) is passed through enthalpy wheel 80. In flowing through enthalpy wheel 80, the outdoor air gives up heat and moisture to enthalpy wheel 80. The outdoor air or process air emerges from the enthalpy wheel 80 at condition "C". The heat and moisture from outdoor air adsorbed by enthalpy wheel 80 is removed from the wheel by air from the conditioned space.

The process air exiting enthalpy wheel 80 is introduced to desiccant wheel 8 where moisture is further removed and the temperature increases considerably. All or a portion of the air exiting desiccant wheel 8 can be passed through a heat exchanger 18, preferably an air-to-air heat exchanger where heat is removed from the process air. The process air is delivered to indirect evaporative cooler 22 at condition "D". This aspect is represented by the line C-D (FIG. 12).

In passing through indirect evaporative cooler 22, the process air can be delivered to a conditioned space 30 at condition "E" represented by the line D-E. If desired, the process air may be cooled further by directing it through direct evaporative cooler 26 after exiting indirect evaporative cooler 22. In direct evaporative cooler 26, the process air temperature is adibatically reduced by evaporating water into the process air, giving condition "F". The amount of water evaporated into the process air can be controlled to provide a condition between "E" and "F", as desired.

In the embodiment shown in FIG. 11, process air from desiccant wheel 8 is directed through heat exchanger 18. In a preferred embodiment, only the hottest portion of the process air, e.g., 20 to 75%, exiting desiccant wheel 8 is passed through heat exchanger 18. The remainder of the process air can be directed along line 16a around heat exchanger 18 and recombined with the portion of process air exiting heat exchanger 18 for introducing into indirect evaporative cooler 22. Fan 10 in FIG. 11 is located between heat exchanger 18 and indirect evaporative cooler 22.

Enthalpy wheel 80 is fabricated from a material suitable for removing both heat and moisture from incoming or outdoor air. Thus, enthalpy wheel 80 is turned at a speed sufficient, e.g., 1 to 50 rpm, so that heat and moisture can be removed from enthalpy wheel 80 by air removed along line 32 from conditioned space 30. Typically enthalpy wheel 80 is fabricated to provide a multiplicity of parallel pores or openings such as a honeycomb structure through which air passes. The wheel can be formed from a coated material such as aluminum, plastic, fiberglass, ceramic and paperboard or desiccant paper having one side corrugated and one side flat. The wheel is formed by winding the coated material into the wheel shape to provide air passageways parallel to the axis of the wheel or by coating an expanded honeycomb material Preferably, enthalpy wheel 80 is fabricated from a desiccant paper employing a fibrous material and a desiccant material dispersed in the fibrous material which has the capability of removing both heat and moisture. Suitable fibrous materials are disclosed herein. Preferred desiccants useful in enthalpy wheel 80 are zeolites. Suitable zeolites include 3A, 4A, 5A, 13X, NaY, HY and USY with 3A and 4A zeolites being preferred. Particle size of the zeolites can range from 0.1 to 50 μm with a preferred particle size being 1 to 4 μm. Smaller pore size zeolites are preferred because they do not retain or adsorb airborne contaminants and thus aid in purifying air in the conditioned space.

Heat exchanger 18 is an important aspect of the present invention because it remarkably increases the efficiency of the subject air conditioning system. That is, it has been discovered that the use of heat exchanger 18 greatly reduces the amount of heat that has to be removed in indirect evaporative cooler 18 and also reduces the amount of heat that has to be added to the system by burner 34. Both savings significantly increase the overall efficiency of the air conditioning system. For example, the coefficient of performance for the system can be increased unexpectedly. That is, the coefficient of performance can be increased from a value of less than 0.6 without heat exchanger 18 to a value of 0.92, for example, for the system using heat exchanger 18. The use of heat exchanger 18 in the air conditioning system of the invention can result in coefficient of performance values in the range of about 0.7 to 1 or higher. For example, if the temperature of inlet or process air to the system is 85° F., temperatures of the process air leaving the desiccant wheel 8 can be about 170° F. leaving the hottest portion of the wheel, and thus, process air at 170° F. is introduced to indirect evaporative cooler 22. However, if the process air leaving desiccant wheel 22 at 170° F. is passed through heat exchanger 18, the temperature can be reduced substantially, for example, to about 130° F. or lower. Thus, the amount of heat required to be removed from the process air in indirect evaporative cooler 22 is substantially reduced. Thus, the overall efficiency of the air conditioner has been substantially increased.

Heat exchanger 18 has another advantage which results in increased efficiency of the subject air conditioning system. That is, heat exchanger 18 used in the present invention is an air to air heat exchanger. For purposes of cooling process air from desiccant wheel 8 in heat exchanger 18, a source of outside air is used. Outside air is introduced along line 50 and/or 52 and is passed through heat exchanger 18 as shown in FIG. 1 for cooling heat exchanger 18. The temperature of outside air used for cooling heat exchanger 18 is significantly increased. For example, the temperature of outside air used for cooling heat exchanger 18 can increase from ambient, e.g., about 85° F., to 150° F. or even higher. Thus, in the present invention, as noted, the cooling air exiting heat exchanger 18 is further heated in burner 34 and then passed through desiccant wheel 8 for purposes of regeneration. This is another important feature of the present invention which results in the high coefficient of performance values. That is, the amount of heat required to be added by burner 34 to provide a stream of air in line 36 having the necessary temperature to regenerate desiccant wheel 8 is significantly reduced. The temperature of air in line 36 used for regeneration is typically in the range of about 200° to 375° F., depending on the desiccant used in desiccant wheel 8. The desiccant can be selected to have a low (about 200° F.) or high (350° F.) temperature of regeneration.

Heat exchanger 18 can be any heat exchanger that permits heat exchange from one air stream to another. For example, heat pipes or a loop having two coils and a circulating heat transfer liquid can be used. Air-to-air heat exchangers which have been used have been fabricated out of aluminum parallel plates. Such heat exchangers are available from Xetex or Deschamp Laboratories.

As shown in FIG. 1, cooling air from heat exchanger 18 removed along line 48 is preferably combined with purge air removed from desiccant wheel 8 along line 46. Purge air exiting desiccant wheel 8 along line 46 can have a temperature of 250° to 260° F., for example. Thus, when purge air is combined with heat exchanger air removed along line 48, the amount of heat required to be added by burner 34 is further reduced.

Figure 2:
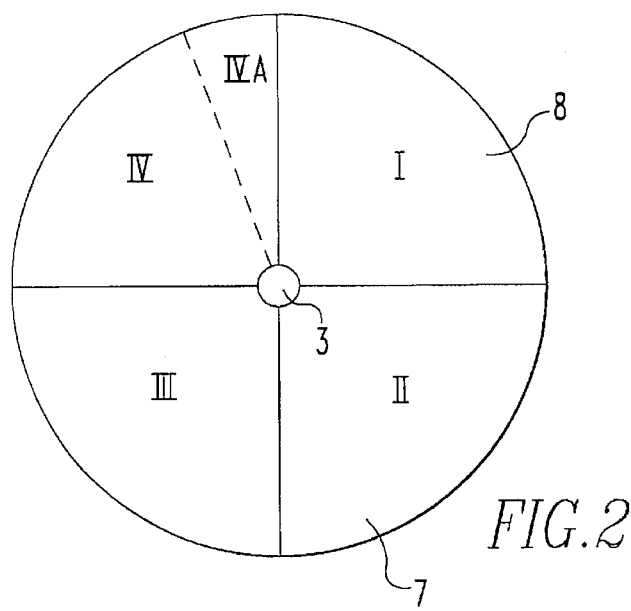
FIG. 2 is a schematic representation of a desiccant wheel showing four quadrants.

FIG. 2 depicts the face of desiccant wheel 8 as seen by entering process air. In the present invention, quadrants I, II and III can be used for passing process air therethrough for purposes of removing moisture therefrom. Quadrant IV is typically used for purposes of regeneration in which hot air and gas from burner 34 flow in a direction counter to the process air. Purge air introduced along line 44 is introduced immediately after regeneration and can be accommodated as a small segment, e.g., IVA, of quadrant IV in which the purge air is flowed counter to the regeneration stream, as shown in FIG. 1. It will be understood that these quadrants are selected for illustration purposes, and that the quadrants used for dehumidifying and regeneration are not necessarily 900° sections and may be changed to suit particular needs. For example, quadrants I and II can be used for passing process air therethrough for dehumidifying and quadrants III and IV used for regeneration by passing heated gas therethrough in a direction opposite to the process air flow. A small segment of quadrant I, such as 5° to 10°, may be used for purposes of purging wheel 8 before introducing process air thereto.

If regeneration is carried out in quadrant IV, with or without a purge, it will be seen that the hottest part of desiccant wheel 8 in FIG. 2 (showing inlet face of wheel) will be encountered in quadrant I when desiccant wheel 8 turns clockwise. Thus, in one preferred mode of operation, process air emanating from quadrant I is separated from the process air in quadrants II and III. In this mode, only the process air dehumidified in quadrant I is passed through heat exchanger 18. Typically, the process air from quadrant I or immediately after regeneration is the hottest. For example, if process air introduced to desiccant wheel 8 has a temperature of 85° F., the temperature of process air emanating from the quadrant I can be 170° F., for example, and the process air emanating from quadrants II and III can be about 130° F. Thus, it is more expeditious to pass the 170° F. process air through heat exchanger 18 because of the larger temperature differential. Further, this reduces the pressure drop through heat exchanger 18 because only one third of the process air is passed through heat exchanger 18. It should be understood that the amount of hot process air passing through heat exchanger 18 can be varied depending on conditions. For example, 20 to 75% of the process air can be directed through heat exchanger 18. In addition, heat exchanger 18 can be sized smaller and thus is more economical to make. It should be noted that if fan 10 is located between heat exchanger 18 and indirect evaporative cooler 22, then process air emanating from quadrants II and III would be shown bypassing heat exchanger 18 and going directly to fan 10 from desiccant wheel 8.

In the present invention, reference is made to desiccant wheel 8. However, it should be understood that desiccant wheel 8 can be replaced with a desiccant body and air duct work provided to periodically regenerate a part of the desiccant body while another part of the body is being used to remove moisture from the process air. Further, the process air stream can be divided into a first air stream and a second air stream. The body can be regenerated by passing hot gases through the body after the first air stream. The second air stream gets depleted of moisture and also cools the body. Preferably, the second air stream is passed through an air-to-air heat exchanger before being united with the second stream for cooling in the indirect evaporative cooler. Such is contemplated within the scope of the invention. When a desiccant wheel is used, typically the wheel rotates at a speed of about 1 to 30 rph and the function of removing moisture from process air and regenerating desiccant wheel 8 using a hot air stream or combustion products from burner 34 is performed on a continuous basis.

Desiccant wheel 8 has a central hub 3 and a casing 7 (FIG. 2). Between hub 3 and casing 7 is provided a regenerative media or paperboard having desiccant dispersed therein for removing moisture from the process air stream.

In one embodiment, the media is fabricated by providing alternating layers of flat and corrugated paperboard that are positioned to provide a multiplicity of open-ended passages parallel to the axis of rotation to permit air to flow therethrough. Typically, the media is formed by winding a web of corrugated paperboard (having a flat sheet of paperboard bonded to one side) about hub 3 until a multi-layered media is built up that extends to outer casing 7. The corrugated paperboard having one side flat is made by bonding or positioning a flat strip of paperboard over a corrugated strip of paperboard The width of the strip determines the width of the wheel, and the edges of the paperboard forms the faces of the wheel. It should be understood other fabrication techniques that form passages may be used.

The media or paperboard for desiccant wheel 8 can be comprised of a fibrous material and any material that operates to remove moisture from an air stream such as process air on a continuous basis.

In accordance with the present invention, there is provided a preferred, adsorptive desiccant wheel formed from a desiccant paperboard comprising temperature-resistant, fibrillated synthetic organic or inorganic fibers and a desiccant material containing either an X-type zeolite in conjunction with silica gel and/or pseudoboehmite alumina or a chemically modified Y-type zeolite.

The desiccant utilized in desiccant wheel 8 can comprise different blends of alumina, silica gel and zeolite. For example, the desiccant can comprise 20–60 wt. % alumina, 0–40 wt. % silica gel, the balance comprising X- or Y-type zeolite. In a preferred embodiment, the desiccant can comprise 20 to 50 wt. % alumina, 20 to 30 wt. % silica gel, with the balance X- or Y-type zeolite. For example, the desiccant can comprise 45 wt. % alumina, 35 wt. % silica gel and 20 wt. % 13-X zeolite, or it can comprise 33 wt. % alma, 33 wt. % silica gel and 34 wt. % 13-zeolite. In certain instances, the desiccant can comprise alumina and zeolite, for example, 50 wt. % alumina and 50 wt. % 13-X zeolite.

Figure 3:
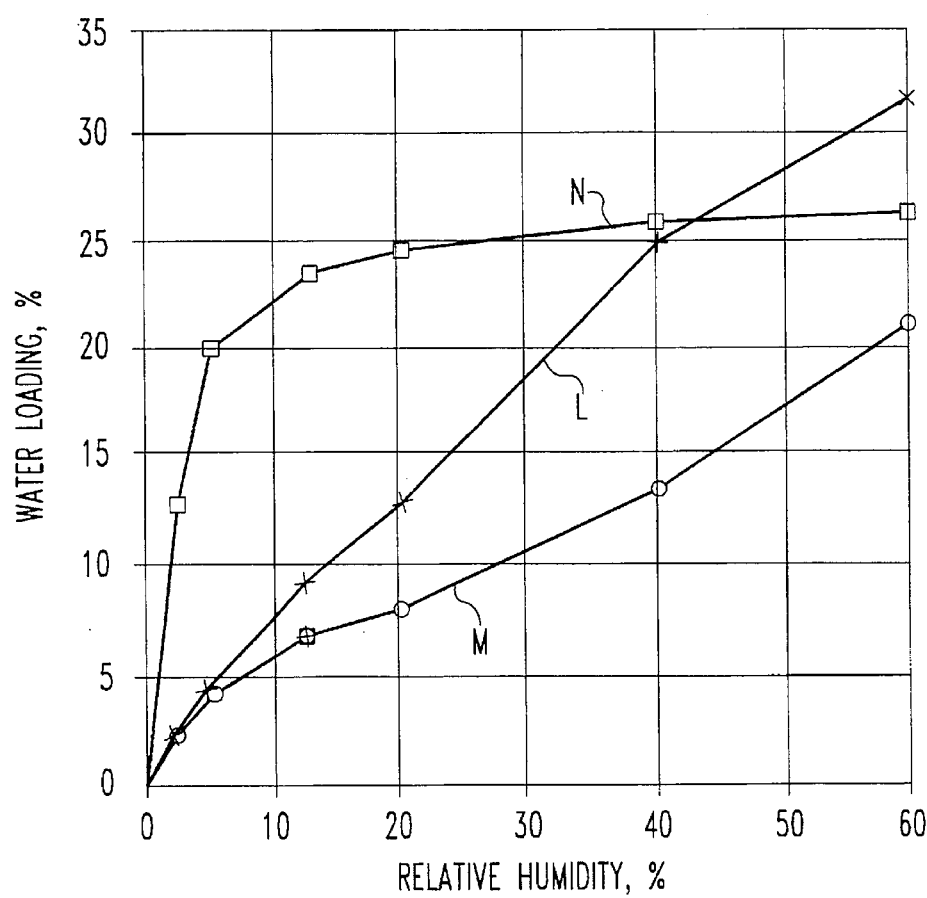
FIG. 3 is a graph comparing water adsorption isotherms for silica gel, pseudoboehmite alumina and a 13-X molecular sieve.

The alumina component is characterized by, pseudoboehmite phase; and may comprise up to 70% of the total desiccant weight. Aluminas characterized by high dispersability in acid are prefected, because of their narrow distribution of internal small pores. Excessive macroporosity is undesirable because it contributes to water adsorption capacity at high relative humidities (i.e., greater than 60% RH). Commonly available acid-dispersible aluminas useful in the present invention are VERSAL® 850 and VERSAL® 900 sold by LaRoche Industries, Inc., and CATAPAL D® sold by Vista Chemicals. As seen from Isotherm M in FIG. 3, the total equilibrium capacity of pseudoboehmite aluminas are too low (14–16%) at 40% RH, and the shape of their isotherms in the 40–60% RH range even become concave-up, which contributes to spreading of their dynamic wavefronts in the end application, thereby making them unacceptable as a desiccant by themselves in high-efficiency dehumidification systems, although they may be advantageously combined with 13-X zeolite in the present invention.

The silica gel suitable for use in the preferred desiccant composition is available from Davison Division of W. F. Grace under the designation SYLOID® 63 silica gel. As illustrated by Isotherm L in FIG. 3, this silica gel exhibits nearly a linear isotherm and is unable to completely contain moisture wavefronts during adsorption. Therefore, a desiccant wheel containing only silica gel as a desiccant component is less desirable for use in a high-efficiency dehumidification or cooling system regenerated at high temperatures. However, because silica gels are good for imparting moisture uptake in the 30–50% RH range, they can be advantageously blended with a desiccant such as 13-X zeolites having enhanced moisture uptake in the low humidity range.

The desiccant composition of the invention can utilize X-type and Y-type zeolites. X-type zeolites exhibit predominantly Type-1 isothermal behavior (see Isotherm N, FIG. 3 for 13-X molecular sieve) and have been found to yield improved performance compared to A-type zeolites. X-type zeolites have channel openings of about 9 Å and compared to A-type zeolites, have a slightly higher silica-to-alumina ratios (e.g., 2–3:1).

In order to determine the adsorption isotherms of two different desiccant blends, aliquots of 13-X molecular sieve sold by the Linde Division of UOP, VERSAL® 900 pseudoboehmite alumina, and SYLOID® 63 silica gel were heated at 200° C. for 1 hour to determine theft respective weight losses so that the desiccant components could be proportioned on a dry weight basis. Loses were 10.4%, 10.7% and 2.0%, respectively, for the components. Physical blends denominated composites A and B were prepared as follows:

| Composite | 13-X Zeolite g | wt. % | Pseudoboehmite g | wt. % | Silica Gel g | wt. % |
|---|---|---|---|---|---|---|
| A | 22.3 | 20 | 50.4 | 45 | 35.7 | 35 |
| B | 37.9 | 34 | 36.9 | 33 | 35.7 | 33 |

Composites A and B were individually mixed with an amount of water in excess of that required to fill all the pores of the desiccant. The aqueous mixtures were then dried at 105° C. for 16 hours. The resulting hard-packed composites were then crushed to approximately ⅛-inch granules and thermally activated in air at 200° C. for 1 hour.

Figure 4:
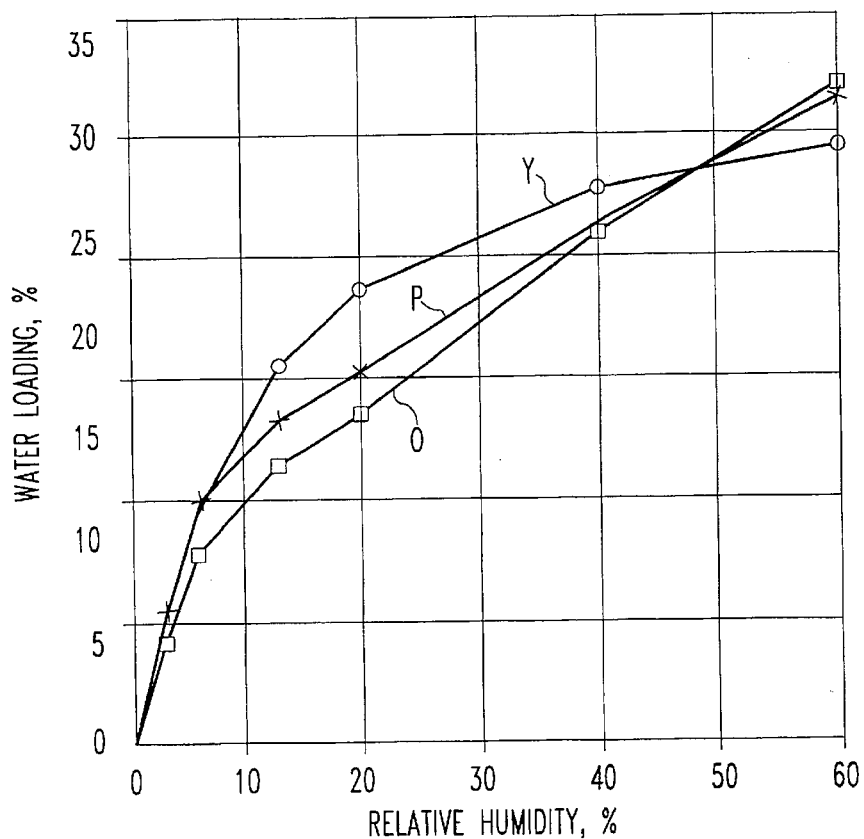
FIG. 4 shows water adsorption isotherms of two example desiccant composites of the present invention compared to that of a Type-1M desiccant.

Adsorption isotherms were determined for composites A and B as previously described, and the results are shown in FIG. 4. As can be readily seen, the alma and silica gel constituents modified the normal Type-1 behavior of the 13-X zeolite component illustrated as Isotherm N in FIG. 3 to isotherms O and P for the A and B composites, respectively, that more closely approach the desirable Type 1-M behavior of Curve Y. Curve Y was derived, assuming a water loading of 25% at 60% RH. An isotherm of Composite B containing equal parts of 13-X zeolite, alumina and silica gel closely approaches the Type 1-M curve Y over the entire range of 0–60% RH, particularly when compared with the isotherms of the individual 13-X zeolite, alumina and silica components.

An alternative to a composite-based desiccant blend, as described above, is the use of a Y-type zeolite, since its structure is stable over a silica-to-alumina mole ratio range of 3 to 6. Techniques have been developed in the we for chemically modifying the silica-to-alumina ratio of Y-type zeolites by either varying the silica content of the initial solution batch or by de-aluminating the zeolite subsequent to the crystallization step by acid leaching (see, e.g., U.S. Pat. Nos. 3,293,192 and 3,402,996 issued to Maher et al; U.S. Pat. No. 4,701,431 issued to Pine; and U.S. Pat. No. 5,052,188 issued to Komarneni et al).

Figure 8:
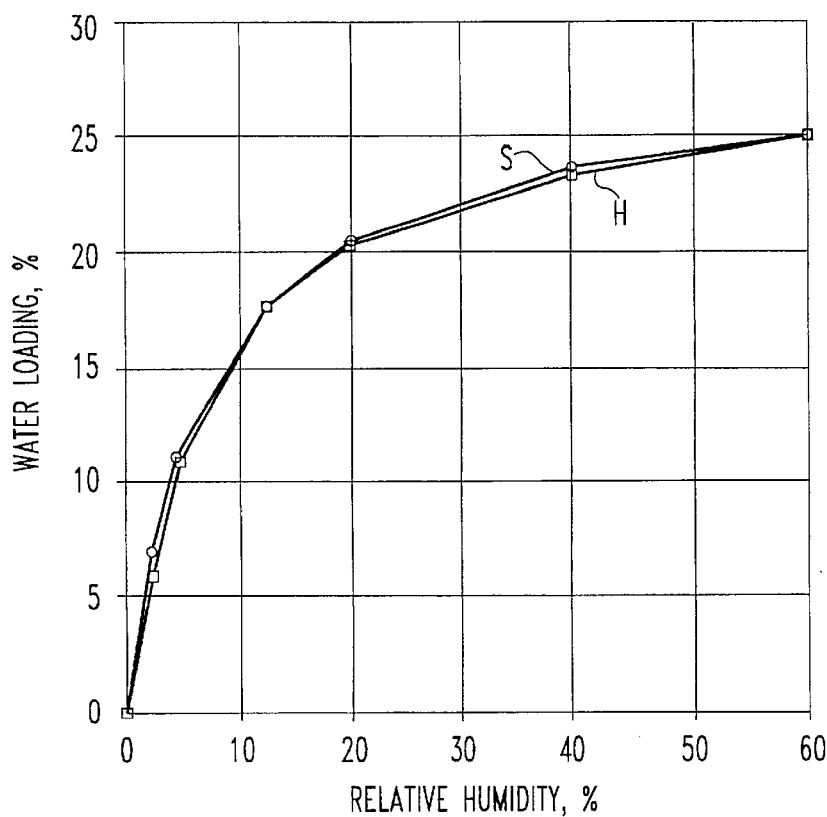
FIG. 8 is a graph showing the isotherm for a modified, Y-type zeolite.
Figure 9:
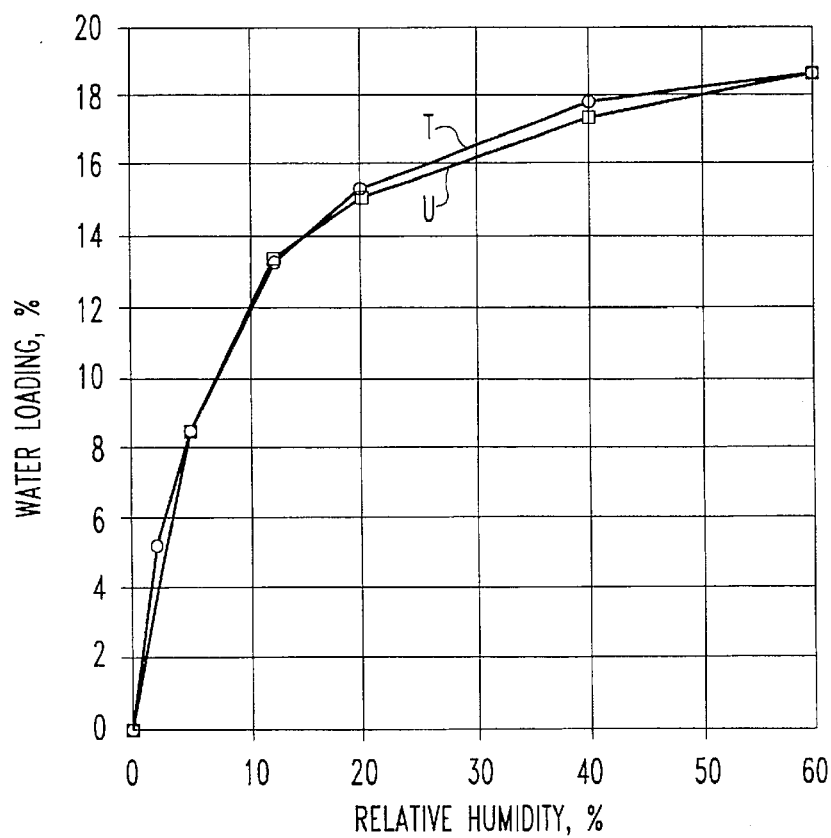
FIG. 9 is a graph showing the isotherm for paper of the present invention made from the chemically modified, Y-type zeolite.

It has now been found that ultra-stable, Y-type zeolite typically yields water adsorption isothermal behavior nearly identical to that of an ideal Type-1M desiccant. FIG. 8 compares Isotherm R, the water adsorption isotherm for Valfor CBV-500 sold by P. Q. Corporation, to Isotherm S, an isotherm with a separation factor of R=0.07. Moreover, as shown in FIG. 9, a handsheet made using the modified Y-type zeolite desiccant provides an Isotherm U that almost precisely matches a normalized Isotherm T with the same separation factor of R=0.07, thereby falling within the preferred R=0.03–0.10 range. Therefore, this material alone meets the Type-1M isotherm standard with high moisture uptake (i.e., 25%) at 60% RH. This material could be used as a single desiccant component to yield alone, or when blended with other desiccants, high-efficiency desiccants for wheel manufacture.

Zeolites that are highly suitable for use in the present invention include zeolites which permit the desorption of water at moderate to low temperatures. Such zeolites include zeolite Y-85, rare earth exchanged zeolite LZ-210 and low cerium exchanged zeolite Y-84 as defined in U.S. Pat. No. 4,503,023, columns 12 and 13, the patent incorporated herein by reference. Rare earth exchanged zeolite LZ-210 can be prepared by subjecting LZ-210 to a rare earth exchange step followed by dry air calcination at a temperature of 55° to 850° C. Y-85, a steam-stabilized form of zeolite Y, is described in U.S. Pat. No. 5,208,197, incorporated herein by reference. Y-84 zeolite is prepared in a manner similar to Y-85 zeolite. In preparing Y-84 or Y-85 zeolite, the second ammonium ion exchange is carried out at greater than pH of 4 and thereafter the resulting zeolite is subjected to a rare earth ion exchange in which the zeolite is contacted with a solution of rare earth salt. It should be understood that lanthanum or cesium may be incorporated by exchange into the Y-84 or Y-85 zeolite.

In the present invention, fibrillated organic fibers, because of their strength and ability to interlock, provide suitable reinforcement at levels as low as 15% by weight of the total desiccant paperboard.

A number of different organic and inorganic fiber materials may be used for the desiccant paper for desiccant wheel 8, depending upon the temperatures at which desiccant wheel 8 is regenerated. For example, inorganic fibers such as fine-diameter fiberglass, mineral wool, or other ceramic materials, may be employed. Although such fibers are stable over a wide range of temperatures, they can suffer from cracking during the paper corrugation stage. Natural organic fibers such as cotton may also be used, although they are limited in regeneration temperature. Synthetic organic fibers useful in the invention are those comprising high-density polyethylenes, high-density polypropylenes, aromatic polyamides (i.e., aramids), polystyrenes, aliphatic polyamides, poly(vinyl chlorides), acrylics (e.g., CFF® fibrillated fibers sold by Cyanamic), acrylonitrile homopolymers, copolymers with halogenated monomers, styrene copolymers, and mixtures of polymers (e.g., polypropylene with low-density polyethylene, and high-density polyethylene with polystyrene).

However, due to its strength, light weight and temperature resistance, the preferred organic fiber for the desiccant wheel of the present invention is selected from aramids. The aramids are manufactured fiber in which the fiber-forming substance is a long-chain synthetic polyamide in which at least 85% of the amide (—CO—NH—) linkages are directly attached to the two aromatic rings. Such aramid fibers are available from DuPont under the trademark KEVLAR®. KEVLAR® is commercially available as a refined pulp designed for paper forming, such as KEVLAR® 303 pulp. During refining, the KEVLAR® fiber shafts are split at the ends into fibrils by means of application of high shear, thereby creating a tree-like structure. In the manufacture of paperboard, it has been discovered that the fibrils interlock to enhance the paperboard strength. KEVLAR® is stable in oxidizing atmospheres up to 450° C. Other high-temperature resistant aramids such as NOMEX®, available from DuPont, is suitable for formation of paperboard in the present invention. However, it is preferred that such fibers are refined or fibrillated in a similar manner.

For purposes of the present invention, KEVLAR® 303 pulp having fiber shafts that are approximately 12 μm in diameter and up to 4 mm in length is first dispersed to form an aqueous slurry. The slurry is then fed to a disc or other high-shear refiner, which is effective in further splitting the fibrillated fiber shafts into additional fibrils. After the refining step, the KEVLAR® 303 fiber shafts range from 1 mm to 4 mm in length with fibrils extending therefrom that are as small as 1 μm to 3 μm in diameter.

For purposes of making paperboard, a slurry of the fibrillated fiber shafts, e.g., KEVLAR® 303 fiber shafts, are transferred to the head box of a paper-making machine.

A second slurry of desiccant ingredients, containing zeolite and optional pseudoboehmite alumina and/or silica gel components, is prepared using a prescribed amount of water per gram of desiccant. The amount of water should be sufficient to achieve a low viscosity and avoid excessive drain times, which result in slow paper machine production times. The desiccant slurry is stirred under low shear to assure thorough mixing of the ingredients without causing excessive particle breakdown.

Additives (e.g., retention aids) and binders known in the art of specialty papermaking may be added together or sequentially to the desiccant slurry to improve the retention of the desiccant components within the fiber matrix and to improve paper strength. Such additives include starch, polyvinyl alcohols (PVA), and microcrystalline cellulose (e.g., carboxymethyl cellulose). To reduce the content of volatile organics in the final paper, it has been discovered as part of this invention that colloidal silicas can be substituted for the organic binders without large decreases in dry paperboard tensile strength. In fact, wet tensile strength and strength at elevated temperatures (i.e., greater than 350° C.) are superior for papers made with colloidal silica when compared with that for papers made with PVA or starch binders.

The desiccant slurry is added to the headbox of the paper machine where the desiccant and fiber slurries are mixed under low shear. A flocculant is added to the headbox and sufficient retention time is provided for the desiccant fiber suspension to form visible flocs. The flocs are considerably larger in diameter than the initial desiccant components and are more easily retained on a moving papermaking screen.

The flocculated slurry then overflows the headbox and onto the moving screen. Water is pulled through the screen by vacuum provided by a series of vacuum boxes. As the water passes through the moving screen, the fibers and desiccant are left on the screen, thereby forming a wet paper. The speed of the screen is variable and can be controlled to provide different paper basis weights and allow for different drainage rates. Flow of slurry to the headbox is also controlled in conjunction with the paper speed adjustments. High belt rates are desirable for economical production and also to produce a thin paper (i.e., less than 0.013 inch after calendaring).

Once the paper leaves the vacuum section of the screen, it passes onto a wet press section and then onto a series of steam-heated drying rolls. The dry paper may optionally be passed through a stack of calendaring rolls which reduce the paper thickness and provide a smoother surface finish.

Figure 5:
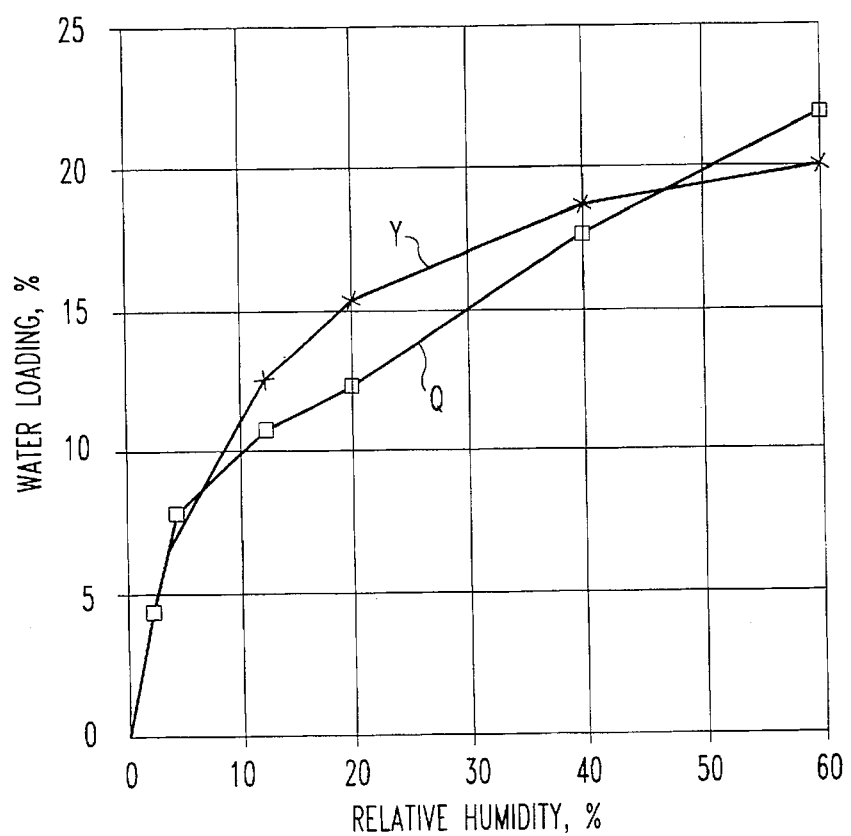
FIG. 5 shows water adsorption isotherms of a handsheet paper made from the 1:1:1 13-X:silica:pseudoboehmite blend of the present invention.

Paper handsheets were then made by a 12×12-inch paper handsheet apparatus comprising an open-top vessel divided into top and bottom sections by a 150-mesh stainless steel screen. A fiber and desiccant slurry comprising Composite B and 3.16 g of KEVLAR® 303 refined pulp (on a 200° C. dry basis) in 650 ml of water was added to the top section of the device. The desiccant slurry comprised 2.10 g of desiccant blend (200° C. basis) in 650 ml of water in order to yield 80% loading (200° C. basis) in the final paper. Retention aids and flocculants were also added. The mixture was stirred until visible flocs formed and then the slurry water was drained under vacuum. After the resulting paper handsheet was dried at 200° C. for 10 minutes. An adsorption isotherm was determined for the paper made with Composite B (designated Isotherm Q) and is compared to Isotherm Y in FIG. 5. Isotherm Y was derived assuming a 20% water loading at 60% RH.

Figure 6:
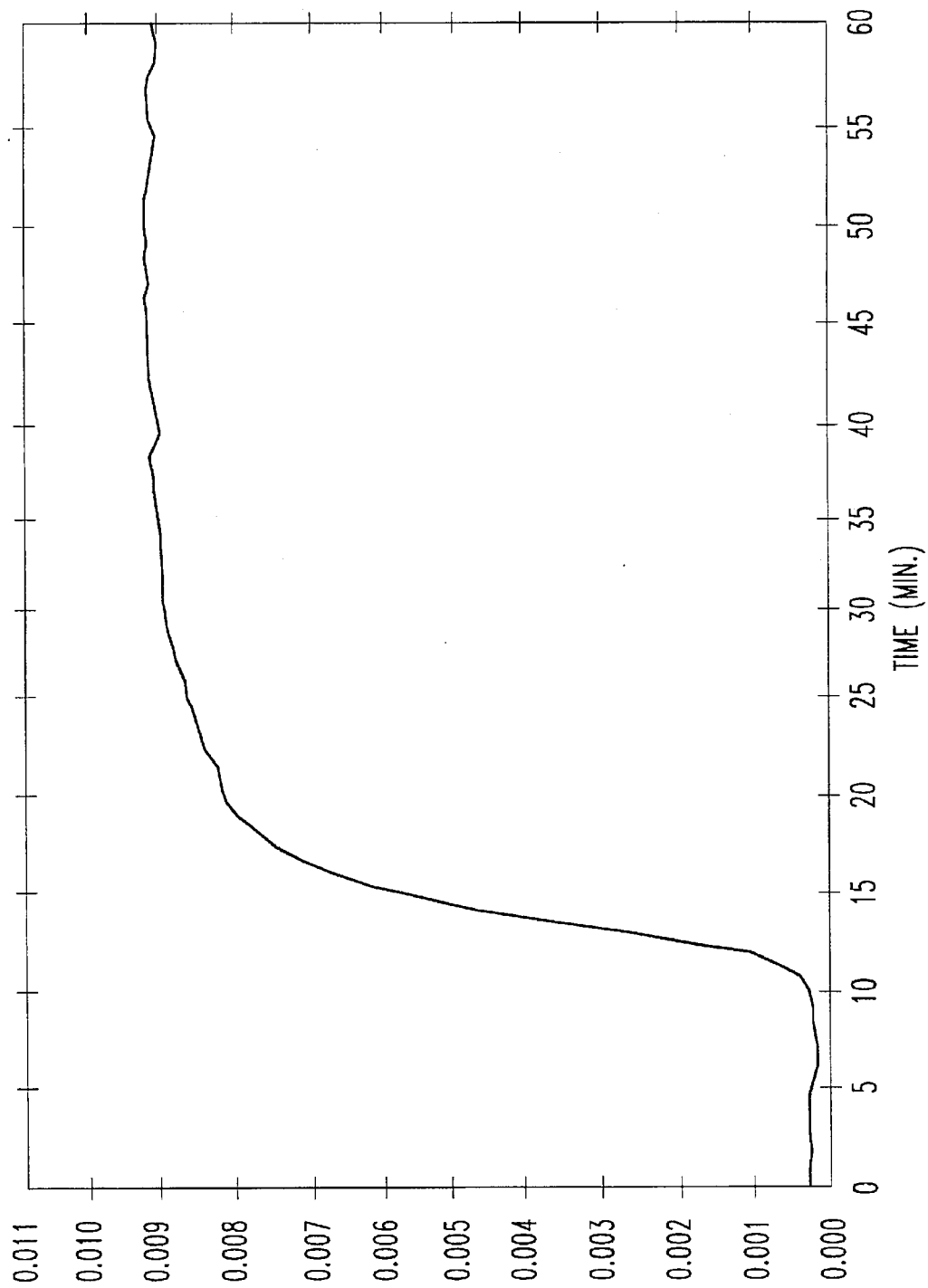
FIG. 6 is a graph showing the dynamic behavior of paper made from the desiccant composite B.
Figure 7:
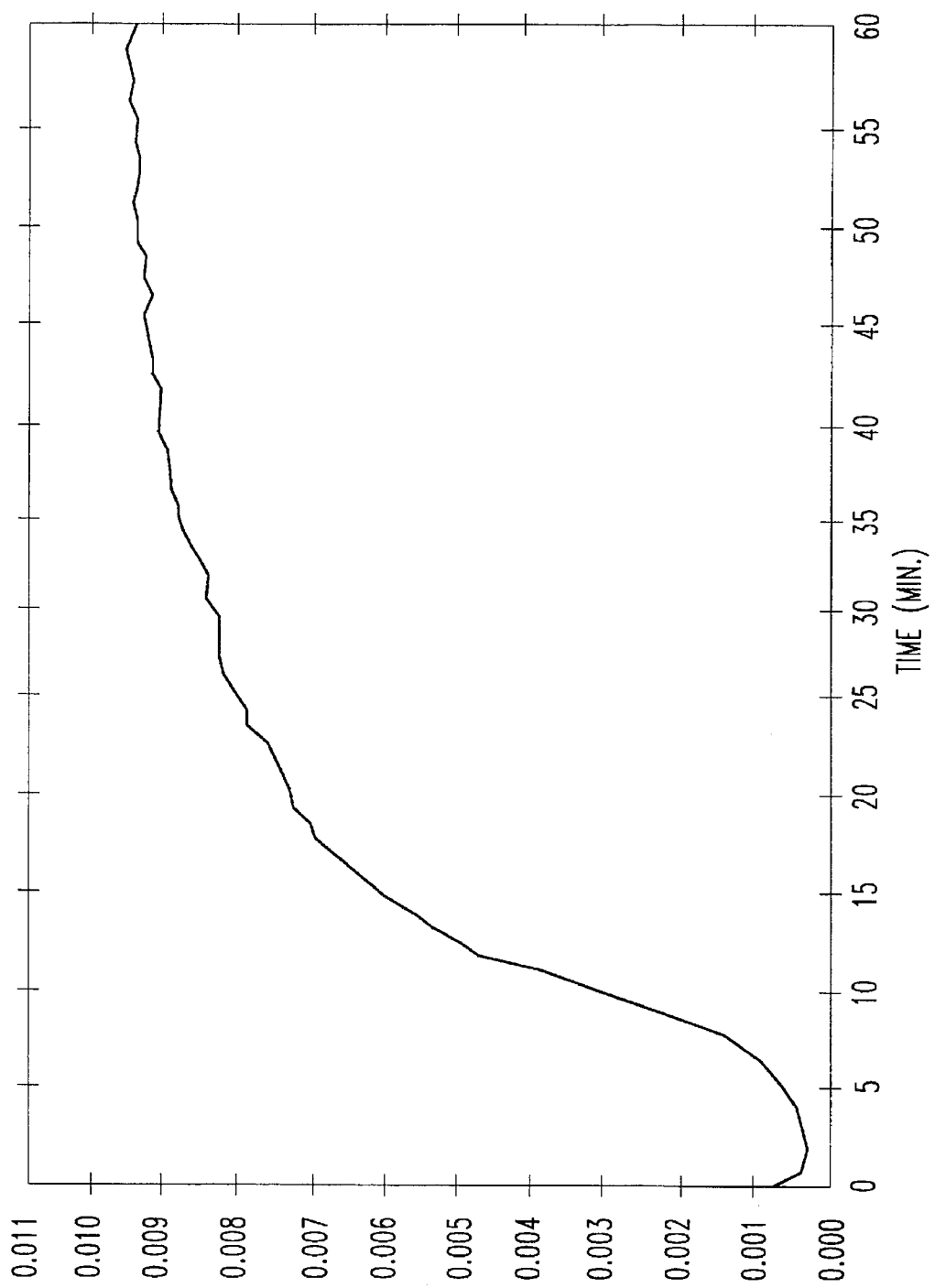
FIG. 7 is a graph showing the dynamic behavior of a core section of a wheel manufactured with a silica gel desiccant composition.

Single-faced corrugated paper made from Composite B was likewise subjected to dynamic testing in which laminates were stacked into parallel flow channels in a closed cell of a dynamic test unit. Laboratory air heated to 110° C. was passed through the flow channels of the cell for a period of 4 hours to fully regenerate the desiccant. The air at 24.5° C. and an inlet humidity ratio of 0.0095 kg water/kg dry air was passed through the cell at a face velocity of 0.58 m/sec and a volumetric flow rate of 0.00156 m$^3$/sec to simulate the conditions experienced in an actual desiccant wheel. The air exiting the cell was monitored for both temperature and humidity. A moisture profile from the dynamic test after 60 minutes time for Composite B is shown in FIG. 6. Compared with a similar dynamic adsorption test conducted on a core section of a commercially available silica gel wheel (FIG. 7), it can be seen that the exit air from Composite B paper is maintained at a significantly lower humidity ratio, and for a longer time period, and that the shape of the adsorption wave front is sharper.

Desiccant wheel 8 can be manufactured using the above materials to provide a wheel or body which will readily adsorb moisture contained in ambient air and desorb the resulting moisture from the wheel during a regeneration cycle of short duration.

While any type of indirect evaporative cooler 22 may be used, it has been discovered that the indirect evaporative cooler disclosed in U.S. Pat. Nos. 5,301,518 and 5,318,843, incorporated herein by reference, is effective in conjunction with desiccant wheel 8 of the present invention in taking warm, high humidity, or moisture-laden air and in an economical manner, producing cool or chilled air with a controlled level of humidity.

Another type of indirect evaporative cooler that may be used employs a dry channel and a wet channel seperated by a heat-exchanging partition wherein heat is extracted from process air in the dry channel through the partition to the wet channel. The partition has a capillary porous material in contact with the wet side of the partition. Air passing through the wet side evaporates liquid out of the porous material thereby extracting heat from process air in the dry side. Air used for purposes of evaporation can be outside air, or a portion of the process air from the dry side, a portion of the air directed from the enthalpy wheel, or air recirculated from the conditioned space may be directed into the wet side. The air streams flowing through the dry and the wet sides do not directly contact each other. In the present invention, process air directed along line 20 enters the dry side and is cooled as it passes therethrough. Thereafter, the cooled air exiting the dry channel may be directed to the space to be conditioned or it may be cooled further in a direct evaporative cooler where a controlled mount of moisture can be added. Other indirect evaporative coolers that may be used in the present invention are described in U.S. Pat. No. 4,112,027, incorporated herein by reference.

While the invention has been described with respect to cooling, its use is not necessarily limited thereto. For example, the system may be used for heating where heat, for example, may be generated by the burner and such heat directed to the conditioned space with duct work (not shown), and such is contemplated within the invention.

The following examples are still further illustrative of the invention.

EXAMPLE 1

In this Example, inlet or process air was provided to an adsorbent wheel at a flow rate of 1413 SCFM, temperature of 85° F., and containing 0.011364 pounds of water per pound of air. The process air was passed through quadrants I, II and III (see FIG. 2). The adsorbent wheel was formed from a desiccant paper which used 20% fibrillated fibers with a desiccant loading of 75 wt. %. The desiccant was comprised of Y-type zeolite having a Type 1M isotherm with a separation factor of 0.07. The wheel was regenerated with a hot air stream heated by a gas burner at a temperature of 355° F., at a flow rate of 348 SCFM and containing 0.01631 pounds of water per pound of air. The regeneration stream of air exiting the adsorbent wheel had a temperature of 115° F. and contained 0.03878 pounds of water per pound of air. The wheel was turning at about 13 rph. A purge air stream was introduced to the adsorbent wheel immediately after regeneration at a rate of 48 SCFM. The purge stream which had a temperature of 257° F. exiting the adsorbent wheel was introduced to the burner for purposes of regeneration. The inlet or process air passing through the adsorbent wheel was divided into two streams. A first stream was flowed through quadrant I, and a second stream was flowed through quadrants II and III. The first stream which was passed through the adsorbent wheel immediately after the regeneration and purge step had an average temperature of about 190° F., leaving the adsorbent wheel. The second stream had an average temperature of about 145° F. The adsorbent wheel removed moisture in both streams to an average level of 0.0054 pounds of water per pound of air. The first stream at about 190° F. was passed through an air-to-air heat exchanger employing aluminum fin and tubes where the temperature was reduced to about 130° F. Outdoor air at a temperature of 95° F. and containing 0.01449 pounds of water per pound of dry air was introduced to the heat exchanger at a rate of 256 SCFM for proposes of cooling the first stream in the air-to-air heat exchanger. The temperature of the outdoor air used for cooling the first air stream in heat exchanger was raised to about 152° F. The outdoor air at 152° F. was then combined with the purge air; both were heated in the gas burner along with gas and make-up air to form the regeneration stream used to generate the adsorbent wheel. The first stream of process air after exiting the heat exchanger was combined with the second stream of process air to provide a mix which was added to the indirect evaporative cooler. The mix of process air had a temperature of about 130° F., contained about 0.0054 pounds of water per pound of dry air and was added to the indirect evaporative cooler at a rate of 1365 SCFM. The temperature of the mix was reduced to 63.2° F. The indirect evaporative cooler employed had dry channels for receiving process air and had wet channels separated from the dry channels by liquid impervious walls through which heat was removed from the dry channel into the wet channel. A portion of the process air in the dry channel was directed after exiting the dry channel into the wet channel for purposes of evaporation in the wet channel. The flow rate of cooled process air from the indirect evaporative cooler was 1365 SCFM. The amount diverted to the wet channels in this example was about 364 SCFM or about 26.7%, the remainder was directed to the conditioned space. In this Example, the system had a cooling capacity of 5.41 tons and a coefficient of performance of 0.92. Thus, it will be seen that the system in accordance with the invention is extremely efficient. For purposes of the present invention, thermal coefficient of performance (COP) is the amount of cooling accomplished (cooling capacity, BTU/h) divided by the thermal energy input (BTU/h). The cooling capacity is the enthalpy difference (BTU/lb dry air) between the system inlet air and the supply air times the mass flow (lb/h) of the supply air. This gives BTU/h which is converted to refrigeration tons by dividing by 12,000 BTU/ton. The parameters of this test are set forth in Table I.

TABLE I

State Points for System with Desiccant Wheel, Heat Exchanger and Indirect Evaporative Cooler

| | Temp. °F. | Dew Point °F. | Flow Rate cfm | Flow Rate scfm | Mass Flow lb/min | Humidity Ratio lb/lb | Relative Humidity % | Enthalpy BTU/lb |
|---|---|---|---|---|---|---|---|---|
| Process Side | | | | | | | | |
| 1  Wheel Inlet | 85.0 | 65.9 | 1494 | 1413 | 106.5 | 0.01364 | 52.9 | 35.39 |
| 2  1st Quadrant Outlet | 170 | | | | | | | |
| 3  2nd & 3rd Quadrant Outlets | 125 | | | | | | | |
| 4  Heat Exchanger Outlet | 129.7 | | | | | | | |
| 5  IEC Inlet | 130.4 | 41.0 | 1494 | 1321 | 99.6 | 0.00540 | 5.6 | 37.34 |
| 6  Supply to Buidling | 63.2 | 41.0 | 1002 | 1000 | 75.4 | 0.00540 | 44.1 | 21.04 |
| 6A  Supply with Optional Direct Evap. Cooler | 53 | 51.0 | 986 | 1000 | 75.4 | 0.00800 | 92.0 | 21.04 |
| 7  IEC Exhaust | 114.7 | 104.1 | 429 | 364 | 27.5 | 0.04905 | 73.6 | 82.06 |
| Regeneration Side | | | | | | | | |
| 8  Outdoor Air | 95.8 | 67.6 | 276 | 256 | 19.3 | 0.01449 | 40.0 | 38.98 |
| 9  Heat Exchanger Outlet | 151.7 | 67.6 | 304 | 256 | 19.3 | 0.01449 | 8.6 | 52.76 |
| 10  Purge | 257.4 | | 48 | 48 | 3.6 | | | |
| 11  Burner Inlet | 168.5 | | | 304 | 22.9 | | | |
| 12  Burner Outlet | 355.7 | 71.0 | 553 | 348 | 26.2 | 0.01631 | 0.3 | 105.25 |
| 13  Flue | 115.4 | 96.8 | 353 | 304 | 22.9 | 0.03878 | 57.9 | 70.83 |

EXAMPLE 2

This Example was carried out substantially the same as in Example 1 except that a heat exchanger was not used to cool the first air stream. Further, outside air was not heated prior to being heated by the burner. The results of this run are provided in Table II. It will be seen that by not passing the first stream through the heat exchanger, the overall efficiency of the system was reduced to a coefficient of performance value of 0.5 (net) and 0.71 (gross). Further, the cooling capacity was reduced to 3.63 tons (net) and 5.19 tons (gross). In addition, the burner input is substantially greater at 87,410 BTU/hr.

TABLE II

State Points for System with Desiccant Wheel and Indirect Evaporative Cooler, No Heat Exchanger

| | | Temp. °F. | Dew Point °F. | Flow Rate cfm | Flow Rate scfm | Mass Flow lb/min | Humidity Ratio lb/lb | Relative Humidity % | Enthalpy BTU/lb |
|---|---|---|---|---|---|---|---|---|---|
| | Process Side | | | | | | | | |
| 1 | Wheel Inlet | 85.0 | 65.9 | 4986 | 1405 | 105.9 | 0.01364 | 52.8 | 35.39 |
| 2 | 1st Quadrant Outlet | 168.2 | 20.0 | 544 | 455 | 34.3 | 0.00229 | 0.9 | 42.97 |
| 3 | 2nd & 3rd Quadrant Outlets | 124.3 | 47.5 | 1020 | 910 | 68.5 | 0.00694 | 8.5 | 37.57 |
| 5 | IEC Inlet | 140.2 | 41.0 | 1568 | 1364 | 102.8 | 0.00539 | 4.3 | 39.69 |
| 6 | Supply to Building | 65.6 | 41.0 | 1007 | 1000 | 75. | 0.00540 | 40.5 | 21.62 |
| 6A | Supply with Optional Direct Evap. Cooler | 53.7 | 51.5 | 988 | 1000 | 75.4 | 0.00805 | 92.0 | 21.62 |
| 7 | IEC Exhaust | 112.0 | 108.3 | 431 | 364 | 27.4 | 0.05619 | 90.0 | 89.30 |
| | Regeneration Side (Burner Input = 87,410 BTU/h) | | | | | | | | |
| 8 | Outdoor Air | 97.5 | 77.1 | 442 | 405 | 30.5 | 0.02015 | 52.3 | 45.65 |
| 9 | Heat Exchanger Outlet | 97.5 | 77.1 | 271 | 248 | 18.7 | 0.02015 | 52.3 | 45.65 |
| 10 | Purge | 260.0 | | | 40 | 3.0 | | | |
| 11 | Burner Inlet | 120.1 | | | 288 | 21.7 | | | |
| 12 | Burner Outlet | 350.0 | 84.6 | 488 | 304 | 22.9 | 0.02595 | 0.4 | 115.56 |
| 13 | Flue | 115.4 | 111.9 | 366 | 304 | 22.9 | 0.06290 | 90.6 | 97.65 |

EXAMPLE 3

This example is illustrated in FIGS. 11 and 12 and is based on the use of an enthalpy wheel to remove heat and moisture from outdoor air prior to its being introduced to the desiccant wheel. The system performance is modeled from the performance of the individual components in the system. The enthalpy wheel for this application utilizes desiccant paper using acrylic fibers with a desiccant loading of 55 wt. %. The desiccant that is suitable is a 4A zeolite. The adsorbent wheel is formed from desiccant paper having 20% fibrillated fibers. The desiccant has a Type 1M isotherm with a separation factor of 0.07. Outdoor air is fed to the enthalpy wheel at 1429 SCFM, temperature 95° F., and containing 0.01413 lbs H₂O/lb of air. After passing through the enthalpy wheel, the temperature is reduced to 85° F. and a humidity level of 0.01240 lbs H₂O/lb of air. The enthalpy wheel is regenerated by passing air from the conditioned space at 80° F. and containing 0.01092 lbs H₂O/lb of air. After passing the process air from the enthalpy wheel through the desiccant wheel and through the heat exchanger, the air has a temperature of about 127° F. and contains 0.00541 lbs H₂O/lb of air. Process air from the indirect evaporative cooler has the temperature reduced to 65° F. at 0.00541 lbs H₂O/lb of air. If a direct evaporative cooler is used, the process air temperature can be reduced to about 54° F. at 0.00803 lbs H₂O/lb of air. For purposes of cooling the indirect evaporative cooler, about 429 SCFM of dry air exiting the indirect evaporative cooler is required to be introduced to the wet side of the indirect evaporative cooler, and thus 1000 SCFM is introduced to the conditioned space at 65° F. or is further cooled in the direct evaporative cooler.

This example is diagrammed in FIG. 12 and the enthalpy change from point "A" to "E" or "F" is 16.82 BTU/lb of air. With a supply volume of 1000 SCFM (4521 lbs H₂O/hr), this provides 76,040 BTU/hr. (6.34 tons) cooling. At a fuel input of 72,500 BTU/hr, this gives a thermal coefficient of performance (COP) of 1.05.

The data for this model is produced in Table III below.

TABLE III

State Point Data

| State Point | Dry Bulb °Fdb | Wet Bulb °Fwb | Dew Point °Fdp | Relative Humidity % RH | Humidity Ratio lbw/lba | Specific Volume ft³.lb | Enthalpy BTU/lb |
|---|---|---|---|---|---|---|---|
| A | 95.00 | 75.08 | 66.88 | 40.00 | 0.01413 | 14.30 | 38.39 |
| B | 80.00 | 66.66 | 59.66 | 49.99 | 0.01092 | 13.84 | 31.17 |
| C | 85.70 | 70.37 | 63.19 | 47.09 | 0.01240 | 14.02 | 34.19 |
| D | 126.80 | 73.36 | 41.09 | 6.21 | 0.00541 | 14.91 | 36.47 |
| E | 65.10 | 52.32 | 41.09 | 41.30 | 0.00541 | 13.35 | 21.52 |
| F | 53.59 | 52.32 | 51.33 | 92.10 | 0.00803 | 13.11 | 21.57 |

Thus, it will be seen that the use of an enthalpy wheel to remove heat and moisture as set forth improves the coefficient of performance significantly.

While the invention has been described in tenths of preferred embodiments, the claims appended hereto are intended to encompass other embodiments which fall within the spirit of the invention.

What is claimed is:

1. In a method of conditioning a process stream of air in an air conditioning system wherein a process stream of air is dehumidified and cooled to provide a conditioned stream of air for introducing to a conditioned space, the method comprising the steps of:

(a) providing an enthalpy wheel comprised of an adsorbent contained in a paper web, the enthalpy wheel having a multiplicity of passages through which said process air can flow, the enthalpy wheel capable of regeneration by passing an air stream therethrough having a temperature and humidity lower than said process air;

(b) passing said process air through said enthalpy wheel to remove heat and moisture therefrom;

(c) regenerating said enthalpy wheel by passing return air from the conditioned space therethrough to remove heat and moisture from the enthalpy wheel; thereafter (d) providing an adsorption wheel having a multiplicity of passages through which said process air from said enthalpy wheel can flow for adsorbing moisture therefrom, the wheel capable of adsorption of moisture from said process air and of regeneration;

(e) passing process air from said enthalpy wheel through said adsorption wheel to remove moisture therefrom;

(f) regenerating said adsorption wheel by passing hot gases therethrough to remove moisture from said adsorption wheel;

(g) introducing process air after passing through the adsorption wheel to an indirect evaporative cooler having a dry channel and a wet channel separated by a moisture-impervious wall wherein heat is extracted from the dry channel through said wall to said wet channel, the process air from the adsorption wheel being introduced to said dry channel to provide cooled process air exiting said indirect evaporative cooler to provide a cooled stream of air having a controlled level of humidity; and (h) directing air to said wet channel of said indirect evaporative cooler, said air directed to said wet channel being selected from at least one of outside air, air returned from the conditioned space, a portion of the air from the enthalpy wheel, and a portion of the cooled air exiting the dry side of the indirect evaporative cooler.

2. The process in accordance with claim 1 wherein said enthalpy wheel utilizes an adsorbent selected from the group consisting of silica gel, activated alumina and molecular sieves.

3. The process in accordance with claim 1 wherein said enthalpy wheel utilizes a zeolite adsorbent selected from the group consisting of A-type zeolites, X-type zeolites and Y-type zeolites.

4. The process in accordance with claim 3 wherein said adsorbent is A-type zeolite.

5. The process in accordance with claim 3 wherein said adsorbent is 4A-type zeolite.

6. The process in accordance with claim 1 wherein said paper web contains 5 to 85 wt. % desiccant.

7. The improved enthalpy wheel in accordance with claim 1 wherein said paper web is comprised of 15 to 75 wt. % fibrillated fibers.

8. The method in accordance with claim 1 including introducing a purge stream of air to said adsorption wheel after said regeneration step and prior to passing said process air through said adsorption wheel to purify said adsorption wheel.

9. The method in accordance with claim 8 including introducing said purge stream of air for heating to provide hot gases for regeneration of said adsorption wheel.

10. In a method of conditioning a process stream of air in an air conditioning system wherein a process stream of air is dehumidified and cooled to provide a conditioned stream of air for introducing to a conditioned space, the method comprising the steps of:

(a) providing an enthalpy wheel comprised of an adsorbent contained in a paper web, the enthalpy wheel having a multiplicity of passages through which said process air can flow, the enthalpy wheel capable of regeneration by passing an air stream therethrough having a temperature and humidity lower than said process air;

(b) passing said process air through said enthalpy wheel to remove heat and moisture from the process air;

(c) regenerating said enthalpy wheel by passing return air from the conditioned space therethrough to remove heat and moisture from the enthalpy wheel;

(d) providing an adsorption wheel having a multiplicity of passages through which said process air can flow for adsorbing moisture therefrom, the wheel capable of adsorption of moisture from said process air and of regeneration on a continuous basis as the adsorption wheel rotates;

(e) passing a first portion and a second portion of said process air exiting from said enthalpy wheel through said adsorption wheel to remove moisture from the process air, said first portion of said process air passing through said adsorption wheel after said regeneration, the first portion removing heat from said wheel prior to said second portion passing through said adsorption wheel;

(f) introducing said first portion of said process air to a heat exchanger to remove heat from said first portion;

(g) directing a second stream of air through said heat exchanger to remove heat therefrom to provide a second heated air stream;

(h) regenerating said adsorption wheel by passing hot gases therethrough to remove moisture from said adsorption wheel; and (i) introducing said first portion of said process air after passing through said heat exchanger and said second portion of said process air after passing through adsorption wheel to an indirect evaporative cooler to provide a cooled stream of air having a controlled level of humidity.

11. The method in accordance with claim 10 wherein said first portion comprises 20 to 75% of said process air.

12. The method in accordance with claim 10 including directing said second air stream exiting said heat exchanger for heating to provide said hot gases for regenerating said adsorption wheel.

13. The method in accordance with claim 10 including directing a purge stream of air to said adsorption wheel after said regenerating step and prior to passing said first portion of said process air through said wheel to purify said adsorption wheel as it rotates.

14. The method in accordance with claim 13 including directing said purge stream of air after passing through said adsorption wheel for heating to provide hot gases for regenerating said adsorption wheel.

15. The method in accordance with claim 12 including the step of passing said purge stream through said adsorption wheel in the same direction to the direction of the process air.

16. A method of conditioning a stream of process air wherein the process air is dehumidified and cooled to provide a conditioned stream of air for introducing to a conditioned space, the method comprising the steps of:

(a) providing an enthalpy wheel comprised of an adsorbent contained in a paper web, the enthalpy wheel having a multiplicity of passages through which said process air can flow, the enthalpy wheel capable of regeneration by passing an air stream therethrough having a temperature and humidity lower than said process air;

(b) passing said process air through said enthalpy wheel to remove heat and moisture from the process air;

(c) regenerating said enthalpy wheel by passing return air from the conditioned space therethrough to remove heat and moisture from the enthalpy wheel;

(d) providing an adsorption wheel having a multiplicity of passages through which said process air can flow for adsorbing moisture therefrom, the wheel capable of adsorbing moisture from said process air and of regeneration on a continuous basis as the adsorption wheel rotates;

(e) regenerating said adsorption wheel by passing hot gases therethrough to heat said adsorption wheel;

(f) passing a first portion and a second portion of said process air exiting from said enthalpy wheel through said adsorption wheel to remove moisture from the process air, said first portion of said process air passing through said adsorption wheel after said regenerating thereby removing heat from said adsorption wheel prior to said second portion passing through said adsorption wheel;

(g) introducing said first portion of said process air to a heat exchanger to remove heat from said first portion;

(h) introducing said first portion and said second portion of said process air to an indirect evaporative cooler having a dry side and a wet side separated by a moisture-impervious wall wherein heat is extracted from said dry side through said wall to said wet side, the first portion and the second portion being introduced to the dry side to provide cooled air exiting said indirect evaporative cooler; and (i) directing air to said wet side of said indirect evaporative cooler, said air directed to said wet side being selected from at least one of outside air, air returned from the conditioned space, a portion of the air from the enthalpy wheel, and a portion of the cooled air exiting the dry side of the indirect evaporative cooler.

17. The method in accordance with claim 16 including the step of further cooling a portion of the cooled air exiting the indirect evaporative cooler by passing it through a direct evaporative cooler.

18. The method in accordance with claim 16 including the step of diverting a first fraction of said cooled air from said dry side to said wet side to cool said moisture-impervious wall by evaporating liquid in said wet side into said fraction.

19. The method in accordance with claim 16 including cooling said heat exchanger with a second air stream.

20. The method in accordance with claim 16 wherein said first portion comprises 20 to 75% of said process air.

21. The method in accordance with claim 19 including heating said second air stream exiting said heat exchanger to provide said hot gases for regenerating said adsorption wheel.

22. The enthalpy wheel in accordance with claim 16 wherein said adsorbent in said enthalpy wheel is a material selected from the group consisting of silica gel, activated alumina and molecular sieves.

23. The enthalpy wheel in accordance with claim 16 wherein said adsorbent in said enthalpy wheel is a zeolite selected from the group consisting of A-type zeolites, X-type zeolites and Y-type zeolites.

24. The enthalpy wheel in accordance with claim 16 wherein said adsorbent in said enthalpy wheel is A-type zeolite.

25. The enthalpy wheel in accordance with claim 16 wherein said adsorbent in said enthalpy wheel is 4A-type zeolite.

26. The improved enthalpy wheel in accordance with claim 16 wherein said paper web contains 5 to 85 wt. % desiccant.

27. The improved enthalpy wheel in accordance with claim 16 wherein said paper web is comprised of 15 to 75 wt. % fibrillated fibers.

28. A method for treating a stream of air to produce cooled air to be introduced to a conditioned space, the method comprising:

(a) providing an enthalpy wheel comprised of an adsorbent contained in a paper web, the enthalpy wheel having a multiplicity of passages through which said process air can flow, the enthalpy wheel capable of regeneration by passing an air stream therethrough having a temperature and humidity lower than said process air;

(b) passing said process air through said enthalpy wheel to remove heat and moisture from the process air;

(c) regenerating said enthalpy wheel by passing air from the conditioned space therethrough to remove heat and moisture from the enthalpy wheel;

(d) providing a desiccant body;

(e) passing a first portion and a second portion of process air exiting from said enthalpy wheel through said desiccant body to remove moisture therefrom to provide moisture depleted process air;

(f) regenerating said body by passing hot gases through said body after passing said second portion through said body, said first portion removing heat from said body prior to said second stream passing through said body;

(g) introducing said first portion of process air to a heat exchanger;

(h) providing an indirect evaporative cooler having a dry side and a wet side separated by a moisture impervious wall wherein heat is extracted from said dry side through said wall to said wet side;

(i) introducing said first portion after being cooled in said heat exchanger and said second portion of process air to the dry side of said indirect evaporative cooler to provide cooled air; and (j) diverting air to the wet side of said indirect evaporative cooler, said air directed to said wet side being selected from one of outside air, air returned from the conditioned space, a portion of the air from the enthalpy wheel, and a portion of the cooled air exiting the dry side of the indirect evaporative cooler.

29. The method in accordance with claim 28 including cooling said heat exchanger with a second stream of air.

30. The method in accordance with claim 28 wherein said first portion comprises 20 to 75% of said process air.

31. A method for treating process air to produce cooled air, the method comprising the steps of:

(a) providing an enthalpy wheel comprised of an adsorbent contained in a paper web, the enthalpy wheel having a multiplicity of passages through which said process air can flow, the enthalpy wheel capable of regeneration by passing an air stream therethrough having a temperature and humidity lower than said process air;

(b) passing said process air though said enthalpy wheel to remove heat and moisture from the process air;

(c) regenerating said enthalpy wheel by passing air from the conditioned space therethrough to remove heat and moisture from the enthalpy wheel;

(d) providing a desiccant wheel having a multiplicity of passages through which said process air can flow for adsorbing moisture therefrom, the wheel capable of adsorbing moisture from said process air and capable of being regenerated on a continuous basis as the wheel rotates;

(e) regenerating said desiccant wheel by passing hot gases therethrough to heat said desiccant wheel;

(f) providing process air comprised of a first portion and a second portion;

(g) passing said first portion of said process air through said desiccant wheel to remove moisture therefrom to provide a moisture depleted first portion;

(h) bypassing said desiccant wheel with said second portion of said process air thereby reducing the pressure drop across said wheel;

(i) providing an indirect evaporative cooler having a dry side and a wet side separated by a moisture impervious wall wherein heat is extracted from said dry side to said wet side;

(j) introducing said moisture depleted first portion and said second portion to the dry side of said indirect evaporative cooler to provide cooled air exiting said indirect evaporative cooler.

32. The method in accordance with claim 31 including the step of directing a portion of said cooled air exiting the dry side of said indirect evaporative cooler to the wet side of said indirect evaporative cooler to extract heat from said dry side through said moisture impervious wall by evaporation of liquid in said wet side into said portion of said cooled air directed into said wet side.

33. The method in accordance with claim 31 including the step of passing said moisture depleted first portion through a heat exchanger prior to introducing to said indirect evaporative cooler.

\* \* \* \* \*